US012782995B2

(12) United States Patent
Zhang et al.

(10) Patent No.: US 12,782,995 B2
(45) Date of Patent: Nov. 3, 2026

(54) CONFIGURABLE REFERENCE VOLTAGE GENERATOR

(71) Applicant: Google LLC, Mountain View, CA (US)

(72) Inventors: Tong Zhang, Sunnyvale, CA (US); Meisam Heidarpour Roshan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 171 days.

(21) Appl. No.: 18/930,779

(22) Filed: Oct. 29, 2024

(65) Prior Publication Data

US 2026/0118904 A1 Apr. 30, 2026

(51) Int. Cl.
*G05F 3/26* (2006.01)

(52) U.S. Cl.
CPC .................................... *G05F 3/262* (2013.01)

(58) Field of Classification Search
CPC ...... G05F 3/262; H05B 45/30; G09G 3/3406; G02F 1/133612; G02F 1/133603
USPC .......................................................... 323/316
See application file for complete search history.

(56) References Cited

U.S. PATENT DOCUMENTS 7,446,599 B1 * 11/2008 Wang ...................... G05F 3/242 327/512
9,568,928 B2 * 2/2017 Meyers ................... G05F 1/463
2007/0057717 A1 * 3/2007 Choi ...................... G05F 3/262 327/543
2015/0185754 A1 * 7/2015 Liu ........................ G05F 3/267 323/313
2024/0143012 A1 * 5/2024 Arnold .................... G05F 3/242
2024/0340011 A1 * 10/2024 Bien .................... H03K 17/102

* cited by examiner

*Primary Examiner* — Yemane Mehari
(74) *Attorney, Agent, or Firm* — Colby Nipper PLLC

(57) ABSTRACT

Reference voltage generators provide stable reference voltages to facilitate correct circuit operation. Bandgap voltage generators are becoming less feasible as process nodes shrink. In example implementations, to accommodate smaller devices, an apparatus for generating a reference voltage includes a current generator having at least one current branch that receives a supply voltage, with the current branch including at least one cascode transistor that receives a bias voltage value. The apparatus also includes a first voltage generator that receives a first bias current from the current generator and provides a first voltage value being complementary to absolute temperature. The apparatus further includes a second voltage generator that receives a second bias current from the current generator and provides a second voltage value being proportional to absolute temperature. The apparatus provides a temperature-compensated third voltage value based on a combination of the first voltage value and the second voltage value.

20 Claims, 14 Drawing Sheets

CONFIGURABLE REFERENCE VOLTAGE GENERATOR

BACKGROUND

Computing and other electronic devices play integral roles in manufacturing, communication, transportation, healthcare, commerce, social interaction, entertainment, and other services. For example, electronic devices power the server farms that provide cloud-based, distributed computing functionality for commerce, communication, and artificial intelligence (AI). Electronic devices are also embedded in many different types of modern equipment, from medical devices to home appliances and from vehicles to industrial tools. Personal electronic devices enable portable video viewing and convenient access to intelligent digital assistants. Additionally, one versatile electronic device—the smartphone—has practically become a necessity to have within arm's reach.

To provide these diverse functionalities, electronic devices typically include various circuitries, such as reference voltage generators. Reference voltage generators are used to generate relatively stable and precise reference voltage signals for other components within an integrated circuit (IC). For example, a reference voltage is often utilized by voltage regulator circuits to maintain a constant output voltage irrespective of changes in the supply voltage or load conditions. Accordingly, computer engineers, electrical engineers, and other designers of electronic devices endeavor to improve the operation of reference voltage generators to support their use in electronic devices.

SUMMARY

This document describes hardware and techniques that enable the components of electronic devices to operate with a stable reference voltage. Reference voltage generators are employed to generate a reference voltage (or "voltage reference") for use by components of an integrated circuit within an electronic device. Such components include voltage regulators, sensors, and analog-to-digital converters (ADCs), just to name a few examples. These components operate more accurately using a reference voltage that is stable over process, voltage, and temperature variations. Reference voltage generators that rely on bandgap physics are becoming less feasible as process nodes become smaller and as gate-all-around (GAA) devices are adopted.

Implementations described herein provide for a reference voltage generator for generating a reference voltage that need not rely on bandgap effects and that can operate reliably at voltages below one volt, which better accommodates GAA processes. Moreover, multiple described reference voltage generator configurations provide stability under variations with process, voltage, and/or temperature. To do so, the reference voltage generator combines a first voltage that is complementary to absolute temperature with a second voltage that is proportional to absolute temperature. Different configurations can counteract fluctuations in a supply voltage and/or variations in process across different temperatures.

In described implementations, a configurable reference voltage generator is provided having components that may be selectably configured and/or tuned to provide an improved reference voltage. In some implementations, one or more cascode transistors are provided within one or more current branches of a reference voltage generator to account for supply voltage changes while generating a more stable reference voltage. In some cases, the cascode transistors can be biased with different bias voltages, or the bias voltage for the cascode transistors may be dependent on a value of the supply voltage. In other implementations, a variable resistor or a transistor with a tunable quantity of stacked gates can be adjusted (e.g., during a circuit testing phase) to account for process variations and thereby increase an accuracy of the generated reference voltage. In these manners, a stable reference voltage can be generated without relying on bandgap physics and/or within an environment having smaller devices, including GAA transistor devices.

In example implementations, an apparatus for generating a reference voltage includes a current generator having at least one current branch configured to receive a supply voltage. The at least one current branch includes at least one cascode transistor configured to receive a first bias voltage value. The apparatus also includes a first voltage generator configured to receive a first bias current from the current generator and provide a first voltage value. The first voltage value is complementary to absolute temperature. The apparatus further includes a second voltage generator configured to receive a second bias current from the current generator and provide a second voltage value. The second voltage value is proportional to absolute temperature. The apparatus is configured to provide a third voltage value based on a combination of the first voltage value and the second voltage value.

In example implementations, an apparatus for generating a reference voltage includes a current generator having a first current branch, a second current branch, a third current branch, and a fourth current branch. The first current branch is configured to receive a supply voltage, with the first current branch including a first cascode transistor configured to receive a first bias voltage. The second current branch is also configured to receive the supply voltage, with the second current branch including a second cascode transistor configured to receive the first bias voltage. The third current branch is additionally configured to receive the supply voltage, with the third current branch including a third cascode transistor configured to receive the first bias voltage. The fourth current branch is further configured to receive the supply voltage, with the fourth current branch including a fourth cascode transistor configured to receive the first bias voltage. The apparatus also includes a first voltage generator configured to receive a first bias current from the fourth cascode transistor and provide a first voltage value, with the first voltage value being complementary to absolute temperature. The apparatus further includes a second voltage generator configured to receive a second bias current from the third cascode transistor and provide a second voltage value, with the second voltage value being proportional to absolute temperature. The apparatus is configured to generate the reference voltage based on the first voltage value and the second voltage value.

In example implementations, a method for generating a reference voltage includes receiving, by at least one current branch of a current generator, a supply voltage, with the at least one current branch including at least one cascode transistor. The method also includes receiving, by the least one cascode transistor, a first bias voltage value. The method additionally includes receiving, by a first voltage generator, a first bias current from the current generator. The method includes providing, by the first voltage generator, a first voltage value, with the first voltage value being complementary to absolute temperature. The method also includes receiving, by a second voltage generator, a second bias current from the current generator. The method additionally includes providing, by the second voltage generator, a second voltage value, with the second voltage value being proportional to absolute temperature. The method further includes generating the reference voltage based on a combination of the first voltage value and the second voltage value.

BRIEF DESCRIPTION OF DRAWINGS

Apparatuses of and techniques for a configurable reference voltage generator are described with reference to the following drawings. The same numbers are used throughout the drawings to reference like features and components.

FIGS. 3-1 and 3-2 are circuit diagrams illustrating example circuit components of a reference voltage generator as depicted in FIG. 2.

FIG. 5-1 is a circuit diagram illustrating an example reference voltage generator circuit.

FIG. 5-2 is a circuit diagram illustrating an example reference voltage generator circuit as in FIG. 5-1 with examples of the components of FIG. 2 overlaid thereon.

FIG. 10-1 is a circuit diagram illustrating another example reference voltage generator circuit including a transistor having a tunable number of stacked gates.

FIG. 10-2 is a diagram illustrating a schematic view of an example of the transistor having a tunable number of stacked gates of FIG. 10-1.

DETAILED DESCRIPTION

Overview

Figure 1:
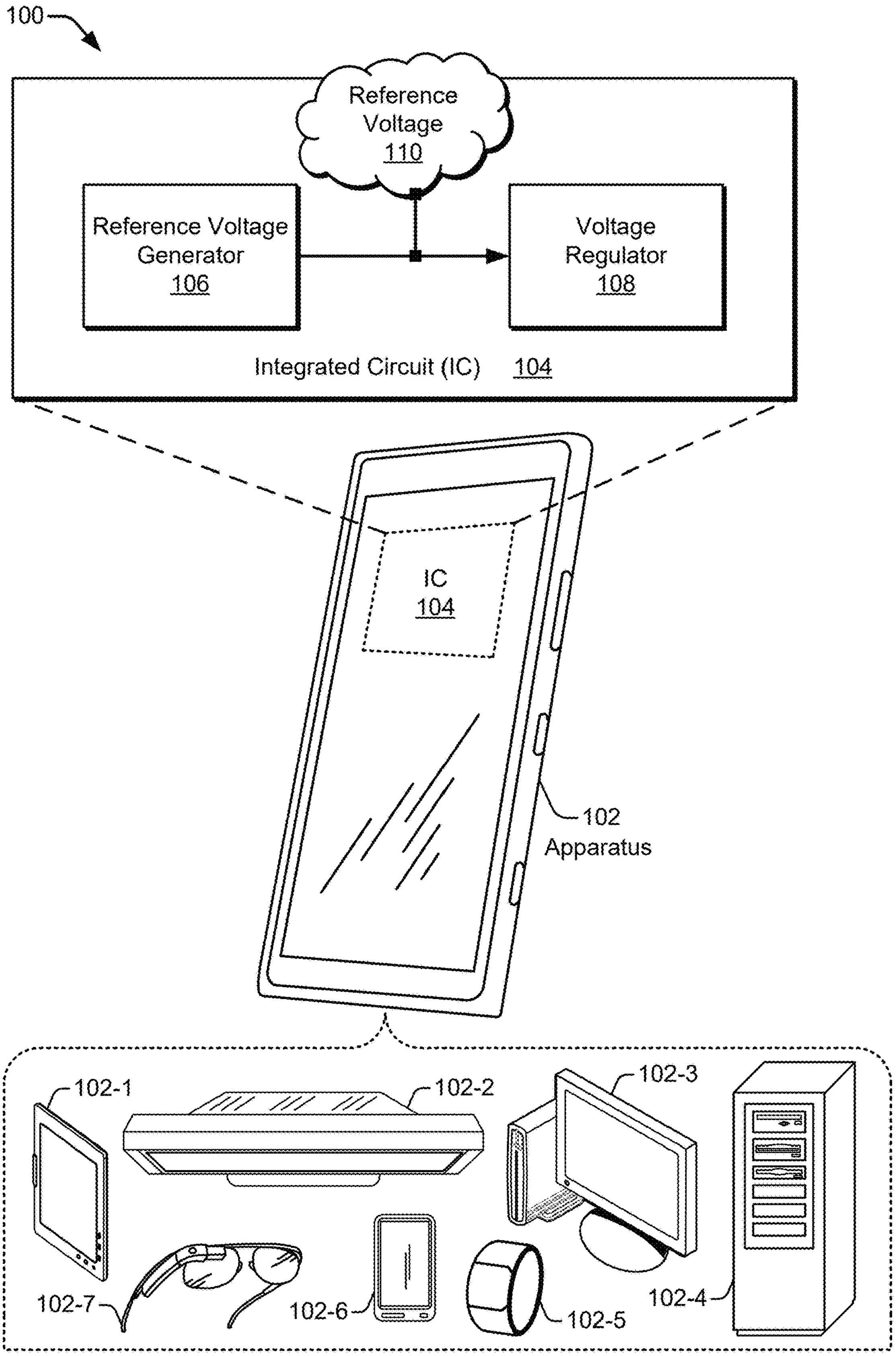
FIG. 1 illustrates an example apparatus with at least one integrated circuit (IC) that includes a reference voltage generator and a voltage regulator.

Electronic devices provide features and perform functions to make important contributions to modern society, such as those related to communication, safety, manufacturing, and content creation. Each electronic device often includes one or more integrated circuits (ICs), and a given IC can include multiple components. These components within an IC often use a reference voltage generator to provide a stable reference voltage over process, voltage, and temperature variations for proper operation of these components, such as voltage regulators, processors, and sensors. Errors introduced in the reference voltage provided to the voltage regulator can be amplified and reflected in the regulated supply voltage provided by the voltage regulator to downstream components.

An example type of reference voltage circuit used in ICs is a bandgap reference voltage circuit. A bandgap reference voltage circuit is typically constructed using bipolar devices such as bipolar junction transistors (BJTs). The bandgap reference voltage circuit can provide a relatively constant voltage with minimal fluctuation from variations of power supply, electrical load, and temperature over time. The transistor devices typically used in the bandgap reference voltage circuit are "non-core voltage devices" that operate at higher, non-core voltage levels (e.g., 1.2 volt (V)) and that may be suitable for driving I/O operations beyond the core of the circuit, including off-chip. Such non-core voltage devices with these voltage levels may not be available in cutting-edge technology nodes.

Further, it is anticipated that bipolar transistors, such as BJTs, may eventually be replaced by more advanced technologies. Analog circuit designers, in particular, confront more formidable design challenges as transistor device technology advances. The introduction of the gate-all-around (GAA) fabrication process for transistor devices has provided digital circuits with higher speeds and densities. The GAA transistor structure allows for the gate to be in contact with the channel region on all sides, allowing for improved channel control. However, the GAA creates significant design challenges for analog designers. Notably, in the GAA process, no "true" 1.2V devices are available due to GAA device constraints, such as the maximum allowed voltage between gate and source terminals ($V_{GS}$), gate and drain terminals (VDG), and drain and source terminals ($V_{DS}$).

If the goal were to scale the transistors and migrate all higher-voltage or non-core device designs to using GAA core transistors at lower supply voltages, significant challenges are faced in the design of reference voltage generator circuits. If, on the other hand, the goal were to use GAA core transistors to operate the reference voltage circuit under an I/O-level supply voltage of 1.2V or higher, many GAA transistors would be operating outside of their safe operation area (SOA), at least during the power down state. Additionally, in some designs, digital logic operates at the I/O or other higher-voltage domain for dynamic element matching and chopping to reduce offset and noise. However, implementing the I/O or other higher-voltage logic with the GAA process presents challenges due to the SOA concerns.

Alternatively, operating the reference voltage circuit at a lower supply voltage, thereby adhering to the SOA requirements, would introduce significant headroom limitations. This would result in operating the BJTs at a significantly reduced current density leading to potential issues with proper circuit operation. One of these issues is that the accuracy of the device model may be compromised because semiconductor foundries typically intend for BJTs to operate at a specific current density based on a fabrication specification. Another issue is that the reference voltage circuit may exhibit an unacceptably slow start-up time, thus failing to meet design specifications for the IC. In addition, the area occupied by BJT-based reference voltage circuits tends to be significant, and this conflicts with a constant drive to minimize the area dedicated to analog circuit components while preserving the performance and addressing cost considerations.

In example implementations as described herein, a reference voltage generator architecture is provided that differs from ones that rely on device bandgap voltage. Instead, the reference voltage generator combines a complementary to absolute temperature (CTAT) voltage component and a proportional to absolute temperatures (PTAT) voltage component to produce a reference voltage. This architecture offers advantages over the device bandgap voltage architecture including the ability to operate under very low supply voltages making it suitable for low-power applications. Further, this architecture offers a compact design as compared to BJT-based solutions, and this enables efficient utilization of area on an IC chip and space within a housing of an electronic device.

In example implementations, a reference voltage generator includes a current generator component, a CTAT voltage generator component, and a PTAT voltage generator component. The CTAT voltage generator component receives a first bias current from the current generator component and provides a CTAT voltage. The PTAT voltage generator component receives a second bias current from the current generator component and provides a PTAT voltage. A CTAT voltage has a negative temperature coefficient such that the value of the CTAT voltage decreases as the operational temperature increases. A PTAT voltage has a positive temperature coefficient such that the value of the PTAT voltage increases as the operational temperature increases. The reference voltage generator combines the CTAT voltage and the PTAT voltage to produce a reference voltage that is more stable at different temperature ranges (e.g., that exhibits a measure of temperature independence). In some implementations, the current generator component includes a current mirror circuit. In some cases, the values of the first bias current and the second bias current are substantially the same based on being mirrored from the same current. In other cases, the values of the first bias current and the second bias current are different.

In example implementations, the current generator component includes one or more current branches. At least one of the current branches includes at least one cascode transistor to improve the supply voltage regulation of the current branches of the current generator component as described herein. Thus, described implementations can accommodate supply voltage fluctuations while still maintaining a stable reference voltage. Other example implementations include a tunable resistor or tunable number of stacked gates for a transistor within the reference voltage generator. These components can be tuned to improve the temperature behavior of the reference voltage across process variations.

In these manners, a reference voltage generator for generating a stable reference voltage is provided in which the behavior of the reference voltage is more stable across changes to the supply voltage and/or process variations. The described hardware and techniques can be implemented across a single reference voltage generator circuit within a single IC or across multiple reference voltage generator circuits. These and other example implementations are described herein.

Example Environments and Electronic Devices

FIG. 1 illustrates, at 100 generally, an example apparatus 102 with at least one integrated circuit 104 (IC 104) that includes a reference voltage generator 106 and a voltage regulator 108. As shown, the reference voltage generator 106 generates a reference voltage 110 and provides the reference voltage 110 to the voltage regulator 108. However, the reference voltage generator 106 can provide the reference voltage 110 to one or more other components instead of or in addition to the voltage regulator 108. The integrated circuit 104 can include or realize a system-on-chip 106 (SoC 106). The apparatus 102, the integrated circuit 104, the SoC 106, and/or the reference voltage generator 106 can implement a configurable reference voltage generator as described herein. The apparatus 102 may, however, be implemented as any suitable computing or other electronic device as described herein.

Examples of the apparatus 102 include a mobile electronic device or mobile device, mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., clothing, watch, or reality-altering glasses), Internet of Things (IoTs) device, sensor, stock management device, electronic portion of a machine or piece of equipment (e.g., a vehicle or robot), memory storage device (e.g., a solid-state drive (SSD)), server computer or portion thereof (e.g., a server blade or rack or another part of a datacenter), and the like. Illustrated examples of the apparatus 102 include a tablet device 102-1, a smart television 102-2, a desktop computer 102-3, a server computer 102-4, a smartwatch 102-5, a smartphone (or document reader) 102-6, and intelligent glasses 102-7.

In example implementations, the apparatus 102 includes at least one integrated circuit 104. The integrated circuit 104 can be part of or realized as a chip, a package, a module, an assembly, or at least one printed circuit board (PCB) (not shown). Examples of a PCB include a flexible PCB, a rigid PCB, a single or multi-layered PCB, a surface-mounted or through-hole PCB, combinations thereof, and so forth. In some instances, one or more integrated circuit (IC) chips can be mounted on a PCB, and the reference voltage generator 106 and/or voltage regulator 108 can be disposed on the PCB to couple two or more chips together.

Each IC chip can be realized as a general-purpose processor, a microcontroller, an application-specific IC (ASIC), and so forth. Other examples of IC chips include a system-on-a-chip (SoC), a security-oriented IC chip, a memory chip, a communications IC chip (e.g., a modem or radio-frequency IC), a graphics processor, an artificial intelligence (AI) accelerator, sensor chips, combinations thereof, and so forth. Sensor chips may include, for example, an accelerometer, a camera or other light sensor, a thermometer or temperature sensor, a satellite positioning system (e.g., a satellite positioning system (SPS) like a Global Positioning System (GPS)) chip, and the like. An integrated circuit chip can be packaged alone or together with other IC chips.

Example Apparatuses and Operational Schemes

Figure 2:
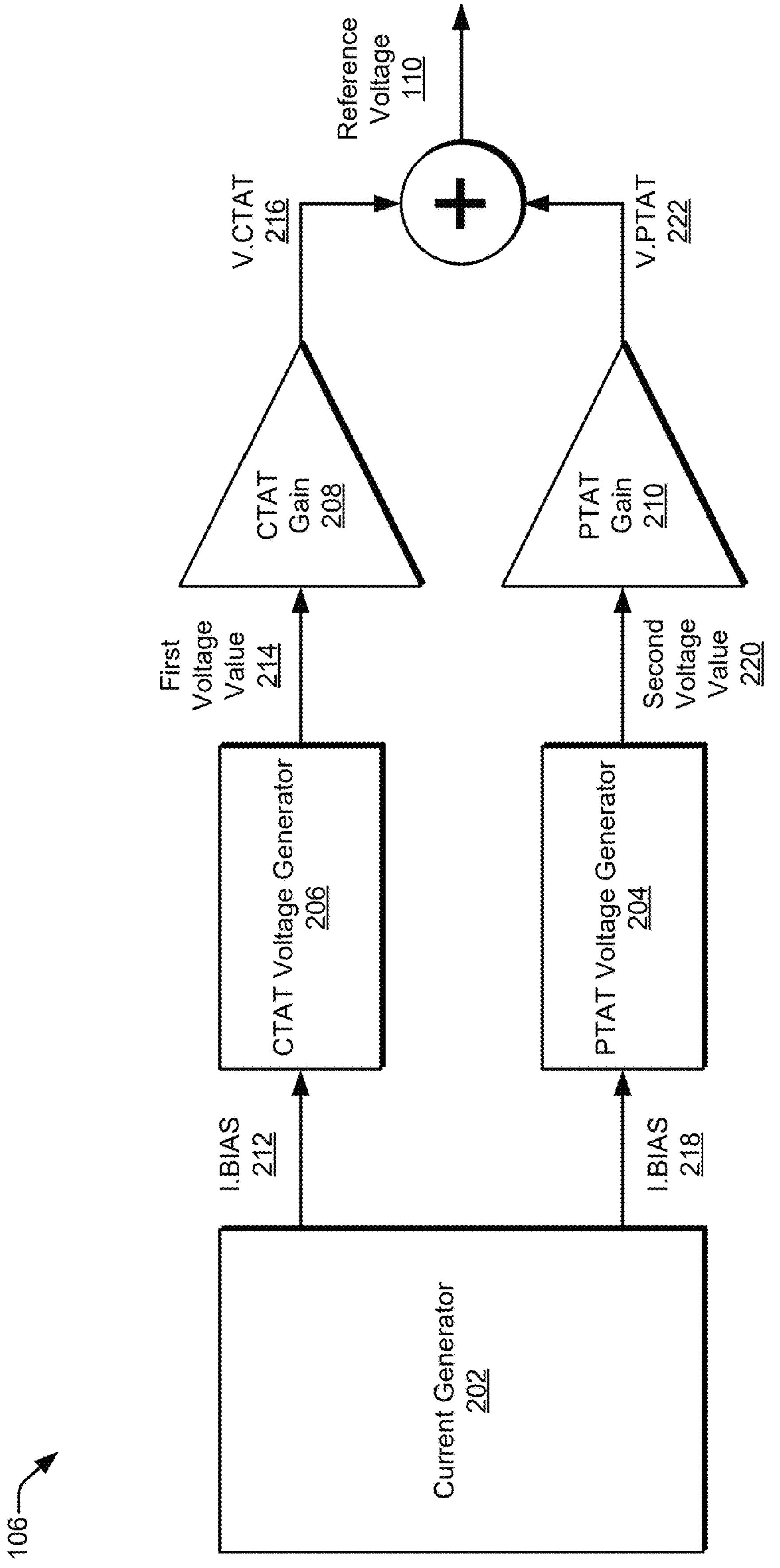
FIG. 2 is a block diagram illustrating an example reference voltage generator for producing a reference voltage.

FIG. 2 is a block diagram illustrating an example reference voltage generator 106 for producing a reference voltage. As shown, the reference voltage generator 106 includes a current generator component 202 (or current generator 202), a PTAT voltage generator component 204 (or PTAT voltage generator 204), and a CTAT voltage generator component 206 (or CTAT voltage generator 206). The current generator component 202 is configured to generate a first bias current (I.BIAS) 212 and provide the first bias current (I.BIAS) 212 to the CTAT voltage generator component 206. The CTAT voltage generator component 206 generates a first voltage value 214 having a characteristic of being complementary to the absolute temperature (CTAT). The first voltage value 214 can be multiplied by a CTAT gain 208 to produce a CTAT voltage value (V.CTAT) 216.

The current generator component 202 is further configured to generate a second bias current (I.BIAS) 218 and provide the second bias current (I.BIAS) 218 to the PTAT voltage generator component 204. The PTAT voltage generator component 204 generates a second voltage value 220 having a characteristic of being proportional to absolute temperature (PTAT). The second voltage value 220 can be multiplied by a PTAT gain 210 to produce a PTAT voltage value (V.PTAT) 222. The V.CTAT voltage value 216 and the V.PTAT voltage value 222 can be combined to produce a reference voltage 110. For example, the two voltage values can be added together (including adding a negative of one of the voltage values to the other voltage value). By choosing an appropriate value of the CTAT gain 208 or an appropriate value of the PTAT gain 210 (including by choosing two appropriate gain values in accordance with a permitted, but optional, inclusive-or interpretation of the word "or"), the resultant reference voltage 110 may be tuned to be substantially constant over the desired temperature range of operation. For instance, at least one gain may be established such that as one voltage value increases by a given amount over a particular temperate range, the other voltage value decreases by the given amount over the particular temperature range. Accordingly, in example implementations, the CTAT voltage generator component 206, the PTAT voltage generator component 204, the CTAT gain 208, the PTAT gain 210, and resulting values of V.CTAT 216 and V.PTAT 222 are architected to provide a reference voltage 110 having improved temperature stability.

Figures 2, 3:
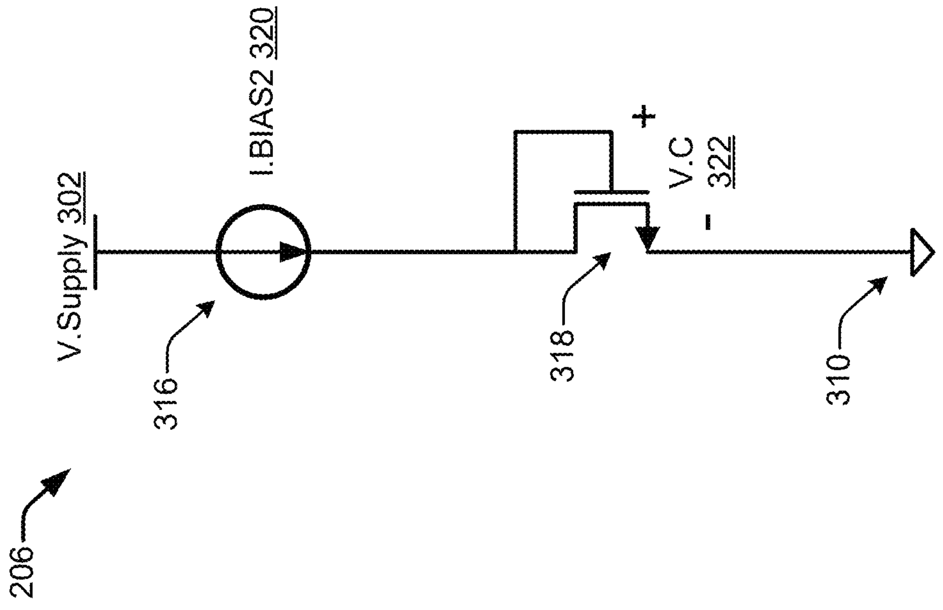
Figures 1, 3:
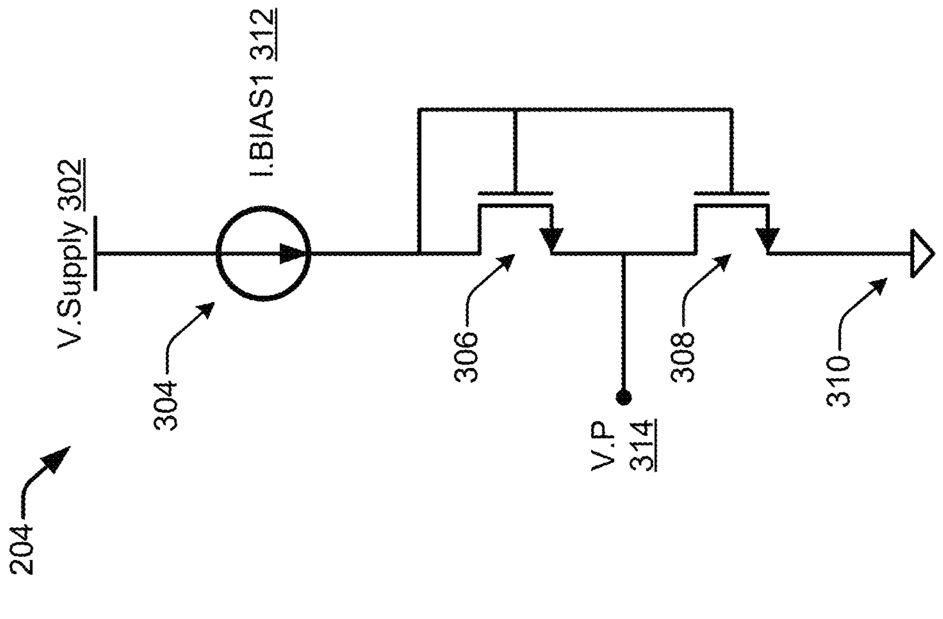

FIG. 3-1 is a circuit diagram illustrating an example PTAT voltage generator component 204 of a reference voltage generator 106. As shown, the PTAT voltage generator component 204 includes a first current source 304, a first N-type metal-oxide-semiconductor (NMOS) transistor 306 and a second NMOS transistor 308. The first and second NMOS transistors 306 and 308 may be realized as field-effect transistors (FETs) as depicted. An input terminal of the first current source 304 is connected to a supply voltage (V.Supply) 302, and an output terminal of the first current source 304 is connected to a drain terminal of the first NMOS transistor 306. The drain terminal of the first NMOS transistor 306 is further connected to a gate terminal of the first NMOS transistor 306 and a gate terminal of the second NMOS transistor 308. Accordingly, the first NMOS transistor 306 is connected in a diode configuration. A source terminal of the first NMOS transistor 306 is connected to a drain terminal of the second NMOS transistor 308, and a source terminal of the second NMOS transistor is connected to a ground 310.

The first current source 304 is configured to receive V.Supply 302 and generate a first bias current (I.BIAS1) 312. The first current source 304 also provides the first bias current 312 to the drain terminal of the first NMOS transistor 306. The first NMOS transistor 306 and the second NMOS transistor 308 operate to generate a PTAT voltage (V.P) 314 at the source terminal of the first NMOS transistor 306 and at the drain terminal of the second NMOS transistor 308. The PTAT voltage (V.P) 314 has a positive temperature coefficient such that the value of the voltage increases as the temperature increases.

FIG. 3-2 is a circuit diagram illustrating an example CTAT voltage generator component 206 of the reference voltage generator 106. As shown, the CTAT voltage generator component 206 includes a second current source 316 and a third N-type metal-oxide-semiconductor (NMOS) transistor 318. The third NMOS transistor 318 may be realized as a field-effect transistor (FET) as depicted. An input terminal of the second current source 316 is connected to the supply voltage (V.Supply) 302, and an output terminal of the second current source 316 is connected to a drain terminal of the third NMOS transistor 318. The drain terminal of the third NMOS transistor 318 is further connected to a gate terminal of the third NMOS transistor 318. Accordingly, the third NMOS transistor 318 is connected in a diode configuration. A source terminal of the third NMOS transistor 318 is connected to a ground 310.

The second current source 316 is configured to receive V.Supply 302 and generate a second bias current (I.BIAS2) 320. The second current source 316 provides the second bias current 320 to the drain terminal of the third NMOS transistor 318. The third NMOS transistor 318 operates to generate a CTAT voltage (V.C) 322 between the gate terminal of the third NMOS transistor 318 and the source terminal of the third NMOS transistor 318. The CTAT voltage (V.C) 322 has a negative temperature coefficient such that the value of the voltage decreases as the temperature increases.

Figure 4:
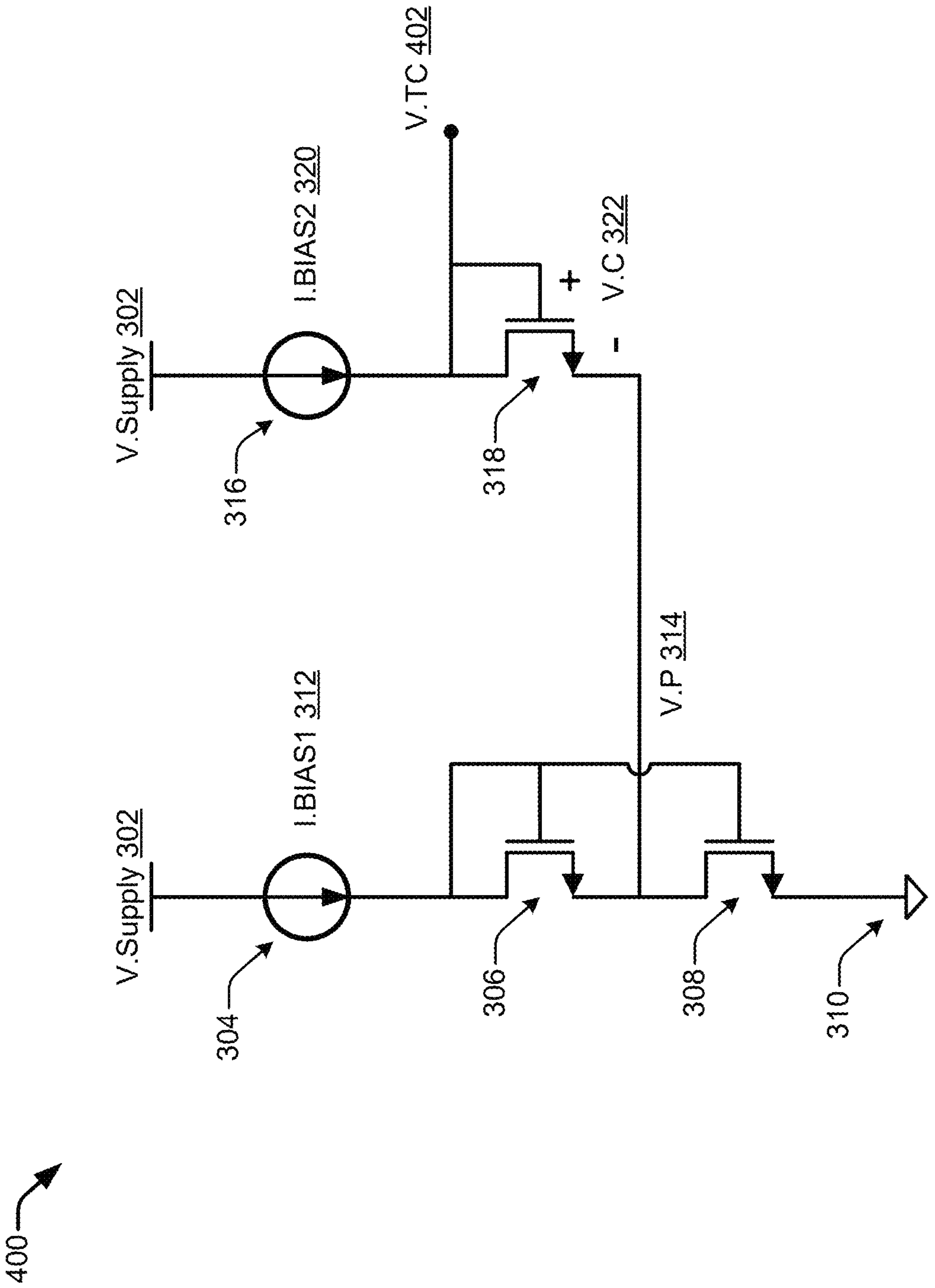
FIG. 4 is a circuit diagram illustrating an example reference voltage generator including the circuit components of FIGS. 2, 3-1, and 3-2.

FIG. 4 is a circuit diagram illustrating an example reference voltage generator portion 400 including the circuit components of FIGS. 2, 3-1, and 3-2. The example reference voltage generator portion 400 includes the PTAT voltage generator component 204 of FIG. 3-1 and the CTAT voltage generator component 206 of FIG. 3-2. In the circuit of FIG. 4, the source terminal of the third NMOS transistor 318 is connected to the source terminal of the first NMOS transistor 306 (and the drain terminal of the second NMOS transistor 308) rather than to ground as depicted in FIG. 3-2. During operation of the reference voltage generator portion 400, the PTAT voltage (V.P) 314 and the CTAT voltage (V.C) 322 are combined to generate a temperature-compensated reference voltage (V.TC) 402 at the drain terminal of the third NMOS transistor 318.

Figures 1, 5:
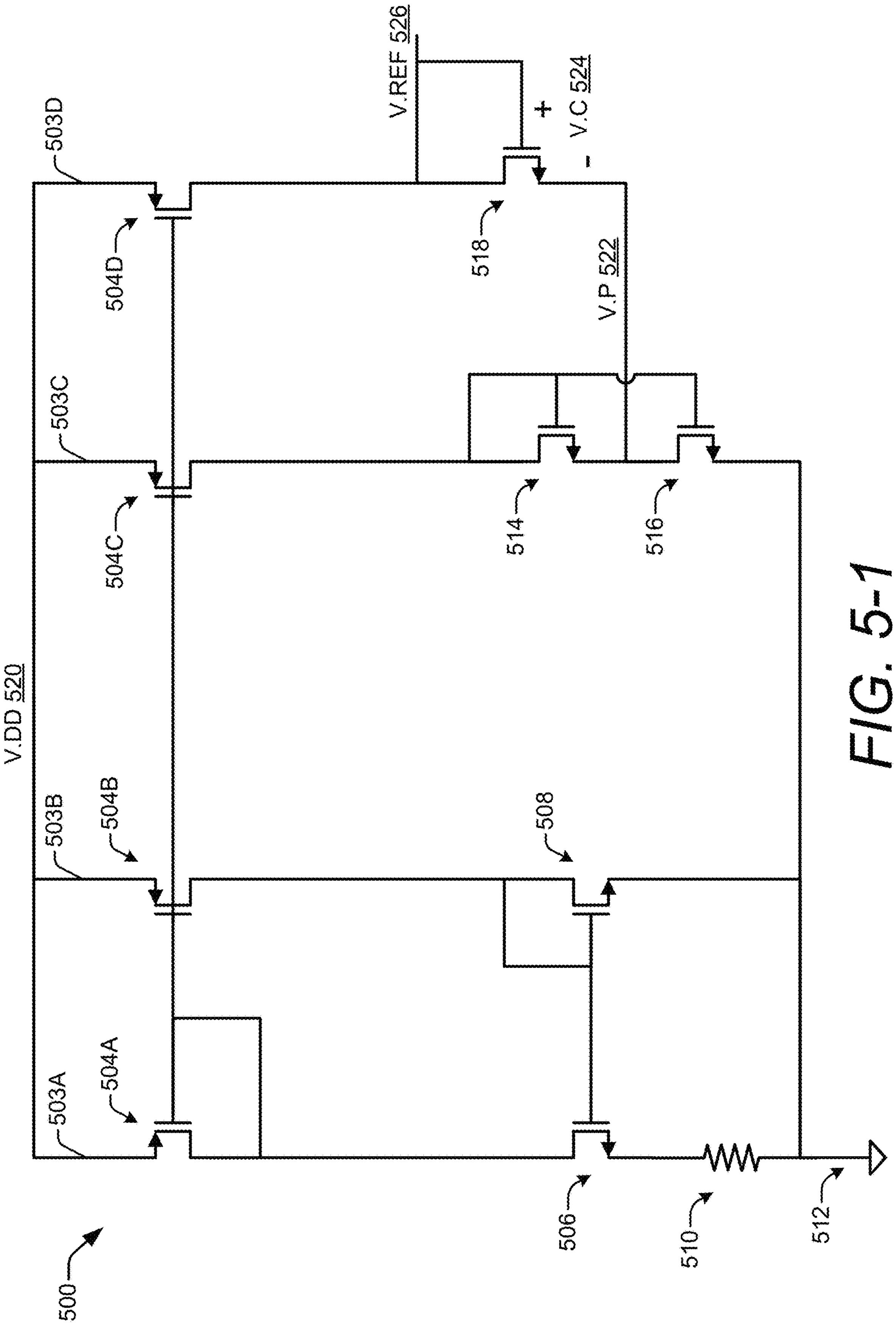
Figures 2, 5:
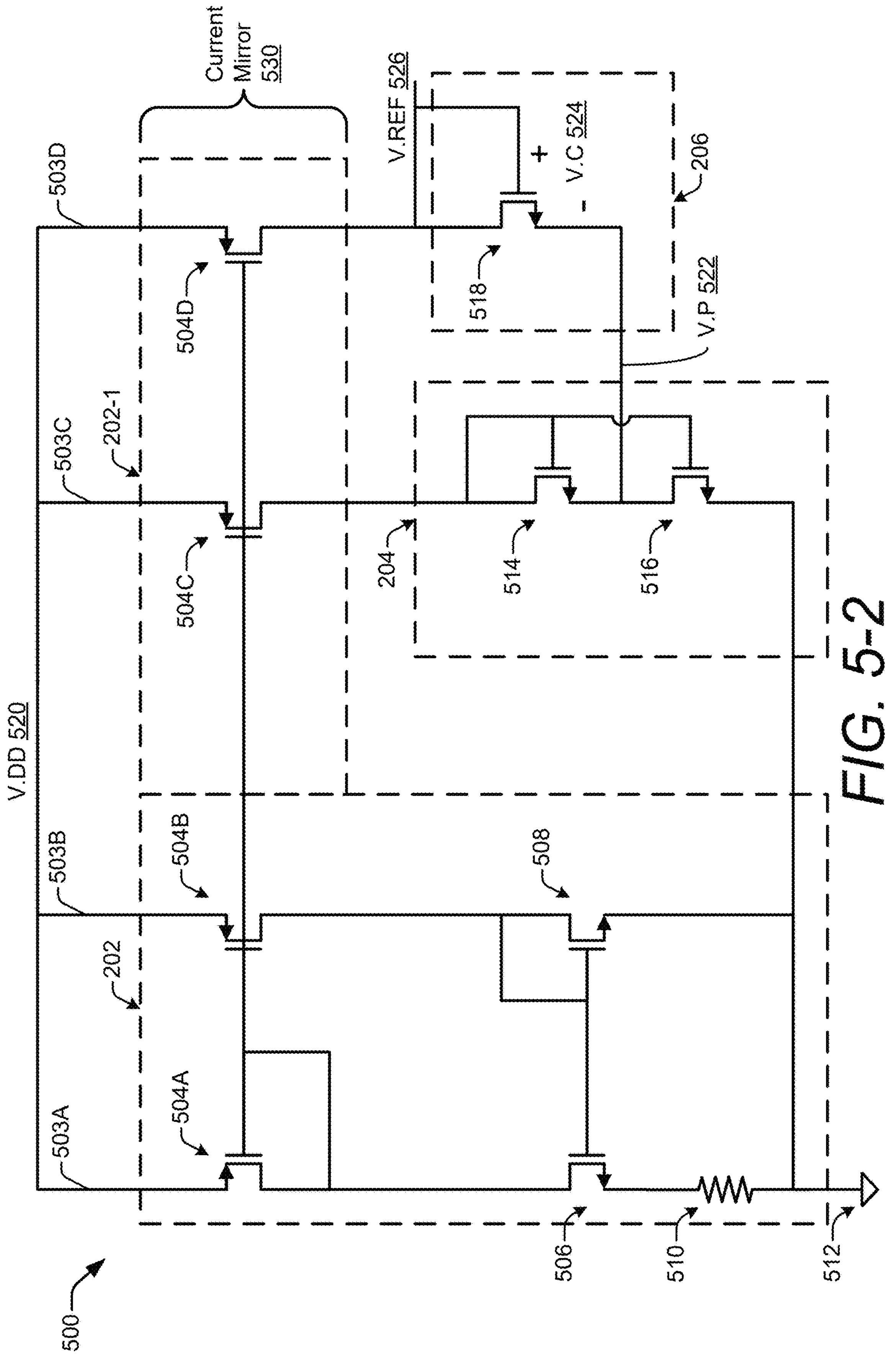

FIG. 5-1 is a circuit diagram illustrating an example reference voltage generator circuit 500. FIG. 5-2 is a circuit diagram illustrating the example reference voltage generator circuit 500 as in FIG. 5-1 with examples of the components of FIG. 2 overlaid thereon. As shown, the reference voltage generator circuit 500 can include a current generator 202, a PTAT voltage generator 204, and a CTAT voltage generator 206. The current generator 202 can include a current mirror 530 having four current branches 503A-503D. The "core" of the current generator 202 includes the current branches 503A and 503B. The current branches 503C and 503D, as indicated at 202-1, mirror the generated current over to the PTAT voltage generator 204 and the CTAT voltage generator 206, respectively.

The PTAT voltage generator 204 includes a first NMOS transistor 514 and a second NMOS transistor 516. The CTAT voltage generator 206 includes a third NMOS transistor 518. As part of the current generator 202, a first current branch 503A includes a first p-type metal-oxide-semiconductor (PMOS) transistor 504A, a fourth NMOS transistor 506, and a resistor 510. A source terminal of the first PMOS transistor 504A is connected to a supply voltage (V.DD) 520, and a drain terminal of the first PMOS transistor 504A is connected to a drain terminal of the fourth NMOS transistor 506. A gate terminal of the first PMOS transistor 504A is coupled to the drain terminal of the first PMOS transistor 504A. A source terminal of the fourth NMOS transistor 506 is coupled to a first terminal of the resistor 510, and a second terminal of the resistor 510 is coupled to a ground 512.

A second current branch 503B of the current generator 202 includes a second PMOS transistor 504B and a fifth NMOS transistor 508. A source terminal of the second PMOS transistor 504B is connected to the supply voltage (V.DD) 520, and a drain terminal of the second PMOS transistor 504B is connected to a drain terminal of the fifth NMOS transistor 508. A gate terminal of the fifth NMOS transistor 508 is connected to the drain terminal of the fifth NMOS transistor 508. A source terminal of the fifth NMOS transistor 508 is connected to the ground 512. The gate terminal of the fifth NMOS transistor 508 is further connected to the gate terminal of the fourth NMOS transistor 506.

A third current branch 503C of the current generator 202 includes a third PMOS transistor 504C, the first NMOS transistor 514 of the PTAT voltage generator 204, and the second NMOS transistor 516 of the PTAT voltage generator 204. A source terminal of the third PMOS transistor 504C is connected to the supply voltage (V.DD) 520, and a drain terminal of the third PMOS transistor 504C is connected to a drain terminal of the first NMOS transistor 514. A gate terminal of the first NMOS transistor 514 is connected to the drain terminal of the first NMOS transistor 514 and a gate terminal of the second NMOS transistor 516. A source terminal of the first NMOS transistor 514 is connected to a drain terminal of the second NMOS transistor 516. A source terminal of the second NMOS transistor 516 is connected to the ground 512.

A fourth current branch 503D of the current generator 202 includes a fourth PMOS transistor 504D and the third NMOS transistor 518 of the CTAT voltage generator 206. A source terminal of the fourth PMOS transistor 504D is connected to the supply voltage (V.DD) 520, and a drain terminal of the fourth PMOS transistor 504D is connected to a drain terminal of the third NMOS transistor 518. A gate terminal of the third NMOS transistor 518 is connected to the drain terminal of the third NMOS transistor 518. A source terminal of the third NMOS transistor 518 is connected to the drain terminal of the second NMOS transistor 516 and to the source terminal of the first NMOS transistor 514. The drain terminal of the third NMOS transistor 518 is further connected to a gate terminal of the third NMOS transistor 518.

The first PMOS transistor 504A, the second PMOS transistor 504B, the fourth NMOS transistor 506, the fifth NMOS transistor 508, and the resistor 510 are configured to generate respective bias currents for the first NMOS transistor 514 and the second NMOS transistor 516 in the third current branch 503C and the third NMOS transistor 518 in the fourth current branch 503D. The first NMOS transistor 514 and the second NMOS transistor 516 in the third current branch 503C are configured to generate a PTAT voltage. The third NMOS transistor 518 in the fourth current branch 503D is configured to generate a CTAT voltage. In some implementations, the first PMOS transistor 504A and the second PMOS transistor 504B are of the same size such that the currents flowing through the fourth NMOS transistor 506 and the fifth NMOS transistor 508 are substantially the same. In at least some of such implementations, the fourth NMOS transistor 506 and the fifth NMOS transistor 508 are of a different size from each other. These different physical sizes produce a voltage differential between the gate-source voltages (Vgs) of the two devices. The voltage differential is produced across the resistor 510 which generates a current that is mirrored across the third current branch 503C and the fourth current branch 503D.

During operation of the example reference voltage generator circuit 500, a PTAT voltage (V.P) 522 is provided from the source terminal of the first NMOS transistor 514 of the PTAT voltage generator 204 to the source terminal of the third NMOS transistor 518 of the CTAT voltage generator 206. The PTAT voltage (V.P) 522 has a PTAT characteristic due to a threshold voltage of the first NMOS transistor 514 and the second NMOS transistor 516 having a PTAT characteristic. The third NMOS transistor 518 produces a CTAT voltage (V.C) 524 between the gate terminal and the source terminal of the third NMOS transistor 518. The PTAT voltage (V.P) 522 is combined with the CTAT voltage (V.C) 524 to produce a reference voltage (V.REF) 526 at the gate and source terminals of the third NMOS transistor 518.

The reference voltage provided by the example reference voltage generator circuit 500 departs from a conventional bandgap reference voltage generator by combining a CTAT voltage with a PTAT voltage. An advantage offered by the example reference voltage generator circuit 500 is that it can operate under low supply voltage, making it suitable for low-power applications. Another advantage offered by the example reference voltage generator circuit 500 is that it provides a compact design compared to BJT-based solutions, enabling efficient utilization of circuit area.

However, the topology of the example reference voltage generator circuit 500 may exhibit problems under certain circumstances. For instance, the example reference voltage generator circuit 500 may produce inconsistence reference voltages in response to changing supply voltage levels. In an example, as the supply voltage changes, the output voltage (V.REF 526) can fluctuate appreciably. Since this reference voltage may be subjected to, for example, a dynamic-voltage-frequency-scaling (DVFS) supply voltage, significant supply variations can be expected in such situations. Substantial reference voltage variations may introduce significant errors in downstream components that are powered based on the reference voltage. For example, if the example reference voltage generator circuit 500 is employed in a current sensor or temperature sensor circuit, these fluctuations may translate into non-negligible sensor measurement errors.

The reference voltage provided by the example reference voltage generator circuit 500 exhibits some temperature dependency due to its reliance on PTAT and CTAT voltage-temperature coefficient cancellation rather than a fundamental bandgap voltage. Consequently, it is possible that the example topology of the reference voltage generator circuit 500 may yield favorable outcomes in one process corner in a given temperature range and less satisfactory outcomes in other process corners. For example, at the typical process corners and slow-slow process corners, the temperature behavior of the reference voltage may be substantially stable over a given temperature range, while the fast-fast process corner temperature curve may exhibit an upward bend at high temperatures. Although calibration for this temperature variation is conceivable, significant complexity would be introduced due to the differing shapes of the temperature curves at different process corners.

This document instead describes different configurations for a reference voltage generator that can account for different process corners. Generally, described implementations configure the example reference voltage generator in different manners such that a stable reference voltage is produced while accommodating supply voltage fluctuations and process variations across a range of temperatures. These different configurations can be used individually or in any combination with each other and are described with reference to FIGS. 6 to 11.

Figure 6:
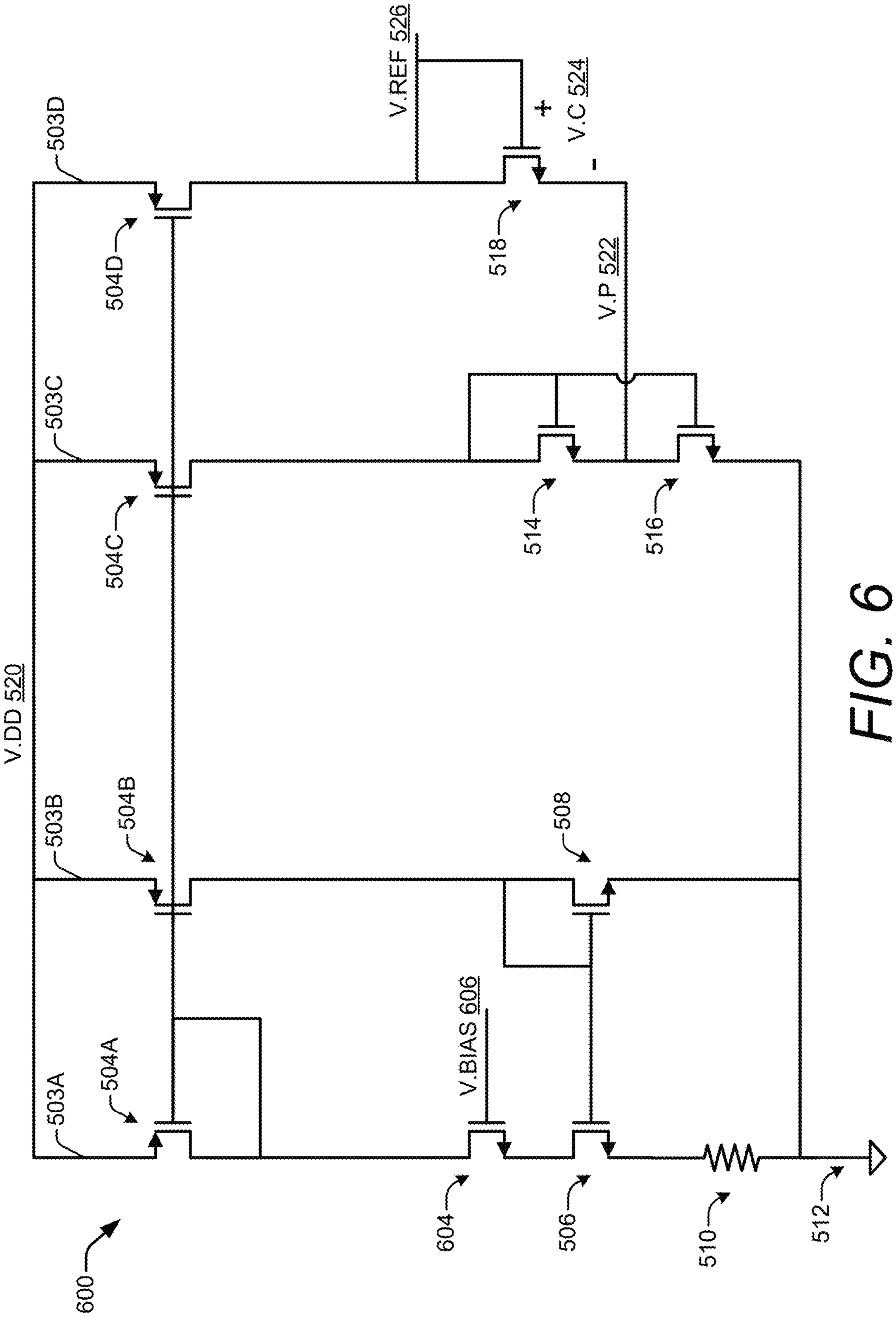
FIG. 6 is a circuit diagram illustrating another example reference voltage generator circuit including a cascode transistor.

FIG. 6 is a circuit diagram illustrating another example reference voltage generator circuit 600 including a cascode transistor to improve operation under supply voltage changes. The reference voltage generator circuit 600 is similar to the reference voltage generator circuit 500 of FIG. 5 except that a first cascode NMOS transistor 604 is inserted in the first current branch 503A (e.g., in series) between the first PMOS transistor 504A and the fourth NMOS transistor 506. In particular, a drain terminal of the first cascode NMOS transistor 604 is connected to the drain terminal of the first PMOS transistor 504A, and a source terminal of the first cascode NMOS transistor 604 is connected to the drain terminal of the fourth NMOS transistor 506. A gate terminal of the first cascode NMOS transistor 604 is connected to a first bias voltage (V.BIAS) 606.

The first cascode NMOS transistor 604 functions to improve supply voltage regulation by protecting the current source provided by the fourth NMOS transistor 506. In operation, the first cascode NMOS transistor 604 reduces the impact of supply voltage changes by maintaining the drain-source voltage of the fourth NMOS transistor 506 at a substantially constant voltage regardless of the supply voltage (V.DD) 520. Instead, the voltage maintained at the fourth NMOS transistor 506 is dependent upon the value of the first bias voltage (V.BIAS) 606 and is equal to V.BIAS minus the Vgs of the first cascode NMOS transistor 604. In some cases, the ability of the reference voltage generator to counteract supply voltage changes may be improved by approximately 20% by including the first cascode NMOS transistor 604.

Although the first cascode NMOS transistor 604 is shown in the example implementation of FIG. 6 as being coupled between the first PMOS transistor 504A and the fourth NMOS transistor 506, in other implementations the first cascode NMOS transistor 604 may be positioned at other suitable locations in the reference voltage generator circuit 600. In addition, although the reference voltage generator circuit 600 is shown as utilizing PMOS and NMOS FET technologies, in other implementations other suitable transistor technologies may be used.

Figure 7:
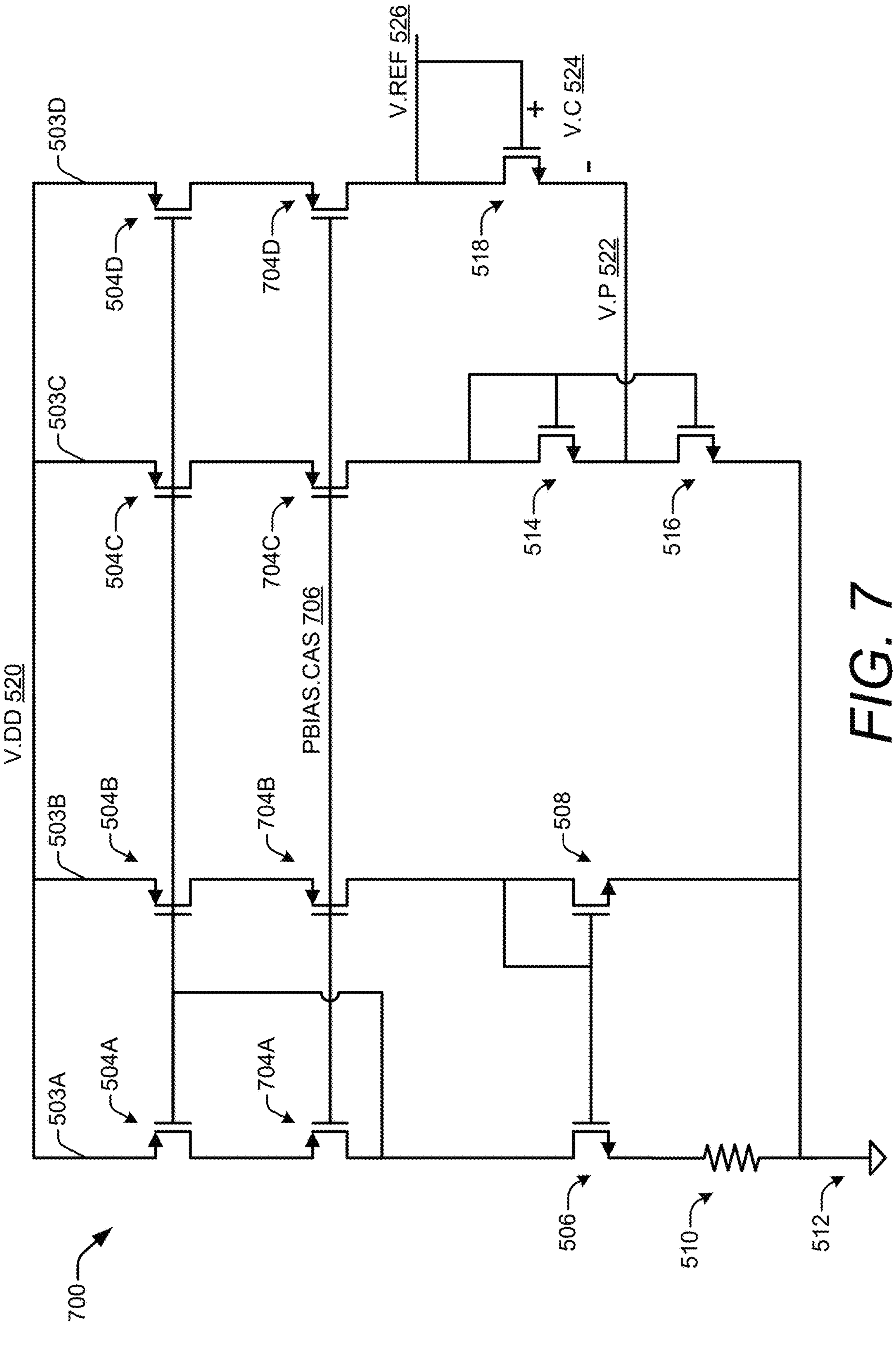
FIG. 7 is a circuit diagram illustrating another example reference voltage generator circuit including multiple cascode transistors distributed across multiple current branches.

FIG. 7 is a circuit diagram illustrating another example reference voltage generator circuit 700 including multiple cascode transistors to improve operation under supply voltage changes. The reference voltage generator circuit 700 is similar to the reference voltage generator circuit 600 of FIG. 6 except that an additional PMOS cascode transistor is inserted in each current branch 503A-503D to improve the performance of the current sources even if the supply voltage (V.DD) changes. A source terminal of a first cascode PMOS transistor 704A is connected to the drain terminal of the first PMOS transistor 504A in the first current branch 503A, and a drain terminal of the first cascode PMOS transistor 704A is connected to the drain terminal of the fourth NMOS transistor 506.

A source terminal of a second cascode PMOS transistor 704B is connected to the drain terminal of the second PMOS transistor 504B in the second current branch 503B, and a drain terminal of the second cascode PMOS transistor 704B is connected to the drain terminal of the fifth NMOS transistor 508. A source terminal of a third cascode PMOS transistor 704C is connected to the drain terminal of the third PMOS transistor 504C in the third current branch 503C, and a drain terminal of the third cascode PMOS transistor 704C is connected to the drain terminal of the first NMOS transistor 514. A source terminal of a fourth cascode PMOS transistor 704D is connected to the drain terminal of the fourth PMOS transistor 504D in the fourth current branch 503D, and a drain terminal of the fourth cascode PMOS transistor 704D is connected to the drain terminal of the third NMOS transistor 518.

Gate terminals of each of the first cascode PMOS transistor 704A, the second cascode PMOS transistor 704B, the third cascode PMOS transistor 704C, and the fourth cascode PMOS transistor 704D are connected to a second or cascode bias voltage (PBIAS.CAS) 706. The addition of the first cascode PMOS transistor 704A, the second cascode PMOS transistor 704B, the third cascode PMOS transistor 704C, and the fourth cascode PMOS transistor 704D in the respective current branches 503A, 503B, 503C, and 503D increases the output impedance of the current sources. This results in a reduced dependency on the supply voltage (V.DD) 520 of the output current associated with the reference voltage (V.REF) 526. In some cases, the output variation of the reference voltage induced by variations in the supply voltage is improved by the reference voltage generator circuit 700 by approximately 2.5 times relative to the circuit of FIG. 5.

Figure 8:
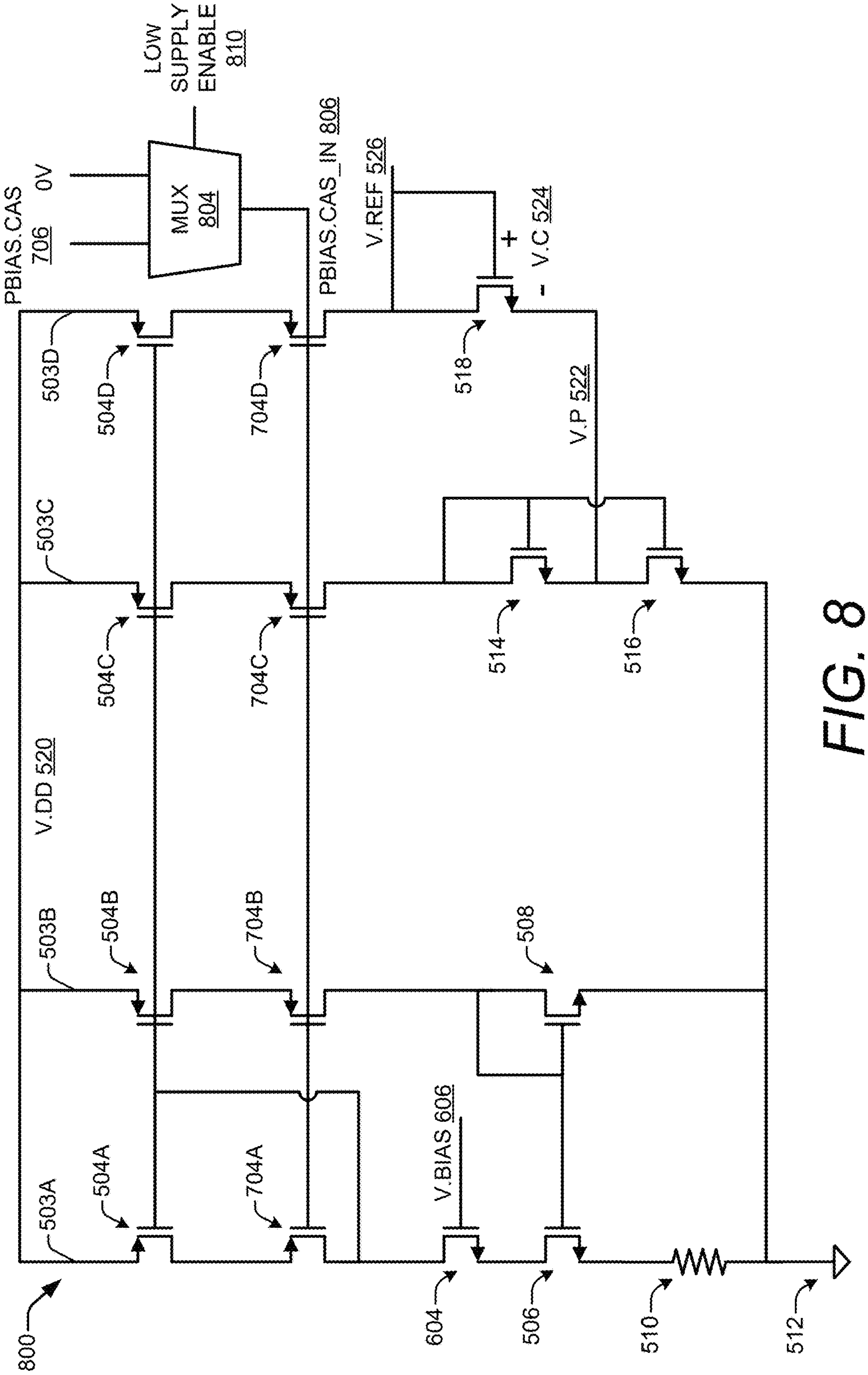
FIG. 8 is a circuit diagram illustrating another example reference voltage generator circuit including multiple cascode transistors as in FIG. 7 with a selectable bias voltage.

Although the implementation illustrated in FIG. 7 omits the first cascode NMOS transistor 604, in other implementations the first cascode NMOS transistor 604 is also included in the first current branch 503A. Thus, in at least some of such implementations, the drain terminal of the first cascode PMOS transistor 704A is indirectly connected to the drain terminal of the fourth NMOS transistor 506 via the first cascode NMOS transistor 604. An example of this configuration with two cascode transistors in the first current branch 503A is depicted in FIG. 8 and described below. In addition, although the reference voltage generator circuit 700 is shown as utilizing PMOS and NMOS FET technologies in particular manners, in other implementations other suitable transistor technologies may be used.

FIG. 8 is a circuit diagram illustrating another example reference voltage generator circuit 800 including multiple cascode transistors with a selectable voltage bias to improve operation under supply voltage changes. The reference voltage generator circuit 800 is similar to the reference voltage generator circuit 700 of FIG. 7 except that the reference voltage generator circuit 800 further includes a multiplexer 804 and the first cascode NMOS transistor 604 of FIG. 6. The multiplexer 804 includes an output connected to the gate terminals of each of the first cascode PMOS transistor 704A, the second cascode PMOS transistor 704B, the third cascode PMOS transistor 704C, and the fourth cascode PMOS transistor 704D.

Under conditions when the supply voltage falls below a particular level, a significant drop in performance may occur due to a lack of voltage supply headroom. At a low supply voltage (V.DD) 520 level, the first cascode PMOS transistor 704A, the second cascode PMOS transistor 704B, the third cascode PMOS transistor 704C, and the fourth cascode PMOS transistor 704D consume a portion of the limited headroom of the circuit, thereby diminishing performance. In such situations, the presence of the first cascode PMOS transistor 704A, the second cascode PMOS transistor 704B, the third cascode PMOS transistor 704C, and the fourth cascode PMOS transistor 704D may be a detriment to the operation of the circuit.

The multiplexer 804 provides for selective enablement or disablement of the first cascode PMOS transistor 704A, the second cascode PMOS transistor 704B, the third cascode PMOS transistor 704C, and the fourth cascode PMOS transistor 704D based on the value of the supply voltage (V.DD) 520. The multiplexer 804 receives an intermediate bias voltage value (PBIAS_CAS) 706 and a ground (e.g., 0V) at respective first and second inputs and receives a low supply enable signal 810 based on the value of the supply voltage (V.DD) 520. In the implementation of FIG. 8, the multiplexer 804 provides either the bias voltage (PBIAS.CAS) or the ground voltage (e.g., 0V) as a cascode bias signal (PBIAS.CAS_IN) 806 to the gates of each of the first cascode PMOS transistor 704A, the second cascode PMOS transistor 704B, the third cascode PMOS transistor 704C, and the fourth cascode PMOS transistor 704D based on the low supply enable signal 810. In other implementations, the multiplexer 804 may be configured to provide a selection between more than two bias voltages.

When the value of the supply voltage (V.DD) 520 is below a predetermined threshold value (e.g., is at a "low" value), the value of PBIAS.CAS_IN 806 is set equal to ground (0V) rather than the bias voltage (PBIAS.CAS) 706. Accordingly, the first cascode PMOS transistor 704A, the second cascode PMOS transistor 704B, the third cascode PMOS transistor 704C, and the fourth cascode PMOS transistor 704D are fully turned on and effectively shorted between their respective source and drain terminals. Thus, the first cascode PMOS transistor 704A, the second cascode PMOS transistor 704B, the third cascode PMOS transistor 704C, and the fourth cascode PMOS transistor 704D are operationally removed from the circuit as each transistor is functioning like a closed switch with a negligible voltage drop along their channels.

When the value of the supply voltage (V.DD) 520 is greater than the predetermined threshold value, the first cascode PMOS transistor 704A, the second cascode PMOS transistor 704B, the third cascode PMOS transistor 704C, and the fourth cascode PMOS transistor 704D are operationally enabled and operate substantially in the manner as described with reference to FIG. 7. In some cases, the output variation of the reference voltage generator circuit 800 of FIG. 8 can be significantly reduced as compared to that of FIG. 5 with an over three times improvement by reducing the impact of supply voltage variations on the stability of the output reference voltage.

Although the implementation illustrated in FIG. 8 is shown as including the first cascode NMOS transistor 604, in other implementations the first cascode NMOS transistor 604 is omitted and the drain terminal of the first cascode PMOS transistor 704A can be directly connected to the drain terminal of the fourth NMOS transistor 506. In addition, although the reference voltage generator circuit 800 is shown as utilizing PMOS and NMOS FET technologies, in other implementations other suitable transistor technologies may be used.

Figure 9:
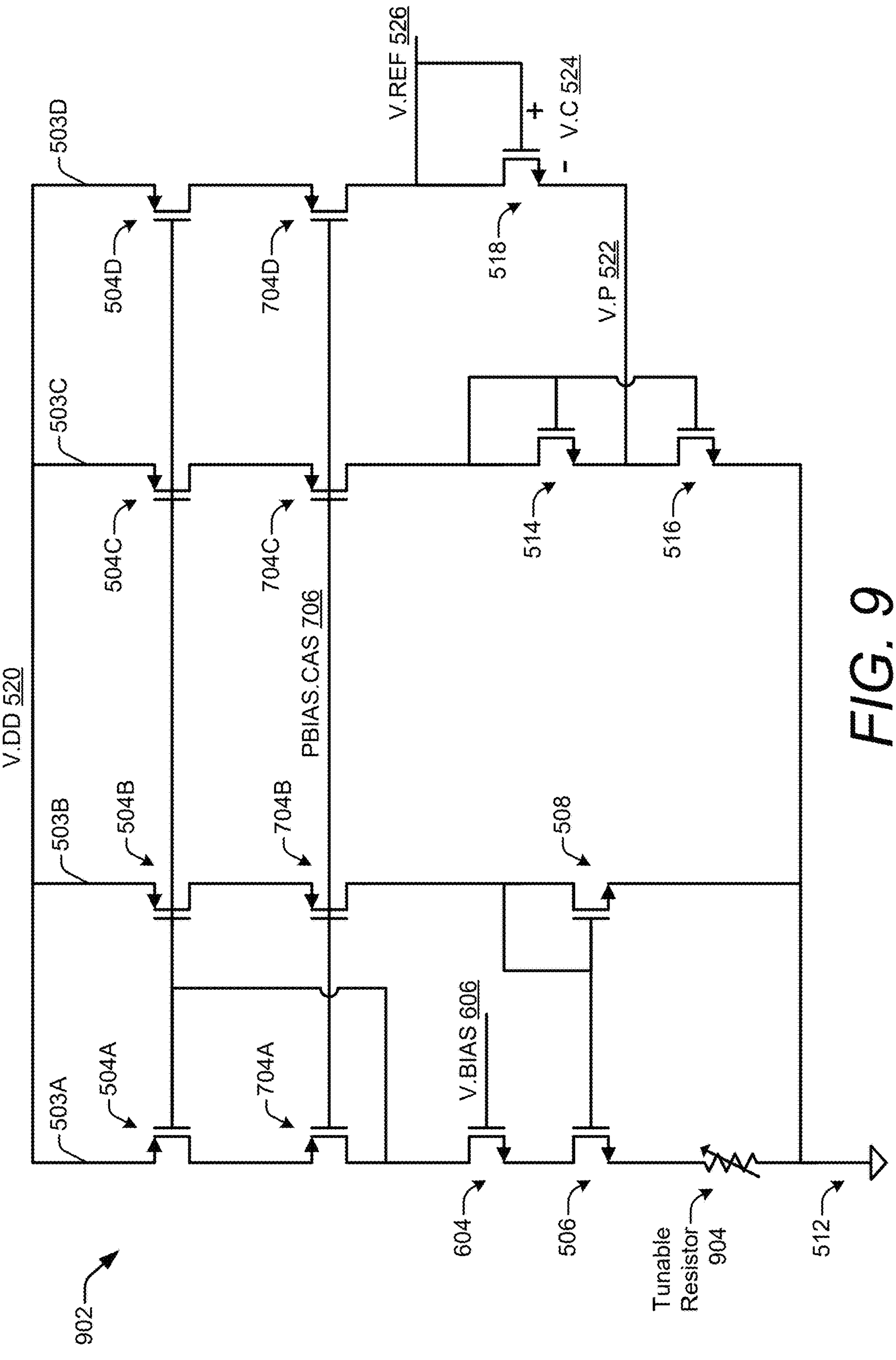
FIG. 9 is a circuit diagram illustrating another example reference voltage generator circuit including a tunable resistor component in a current branch.

FIG. 9 is a circuit diagram illustrating another example reference voltage generator circuit 900 including a tunable resistor component in a current branch to improve temperature behavior of the reference voltage. The reference voltage generator circuit 900 is similar to the reference voltage generator circuit 800 of FIG. 8 except that the resistor 510 is replaced by a tunable (or variable) resistor component 904. The tunable resistor component 904 is configured to allow the resistance value of the tunable resistor component 904 to be varied to improve the temperature variation characteristics of the reference voltage generator circuit 900 across process variations. By adjusting the resistance of the tunable resistor 904, the biasing current within the third branch 503C and fourth branch 503D can be changed to adjust the temperature curve characteristics of the reference voltage 526 to a desired level. For example, the temperature curve can be flatted such that the reference voltage 526 changes less across a relevant temperature range. To account for process variation, the tunable resistor 904 can be adjusted during a manufacturing or testing process. In implementations in which the reference voltage generator circuit 900 is used to provide a reference voltage for a low dropout (LDO) regulator, for instance, the resulting relatively slight deviations in voltage level can be effectively compensated by adjusting the gain of the LDO.

Although the implementation illustrated in FIG. 9 is shown as including the first cascode NMOS transistor 604, the first cascode PMOS transistor 704A, the second cascode PMOS transistor 704B, the third cascode PMOS transistor 704C, and the fourth cascode PMOS transistor 704D, in other implementations one or more of the first cascode NMOS transistor 604, the first cascode PMOS transistor 704A, the second cascode PMOS transistor 704B, the third cascode PMOS transistor 704C, or the fourth cascode PMOS transistor 704D can be omitted. Although the implementation illustrated in FIG. 9 is shown as omitting the multiplexer 804 shown in FIG. 8, other implementations may include a multiplexer to provide for a selectable bias voltage. In addition, although the reference voltage generator circuit 900 is shown as utilizing PMOS and NMOS FET technologies, in other implementations other suitable transistor technologies may be used.

Figures 1, 10:
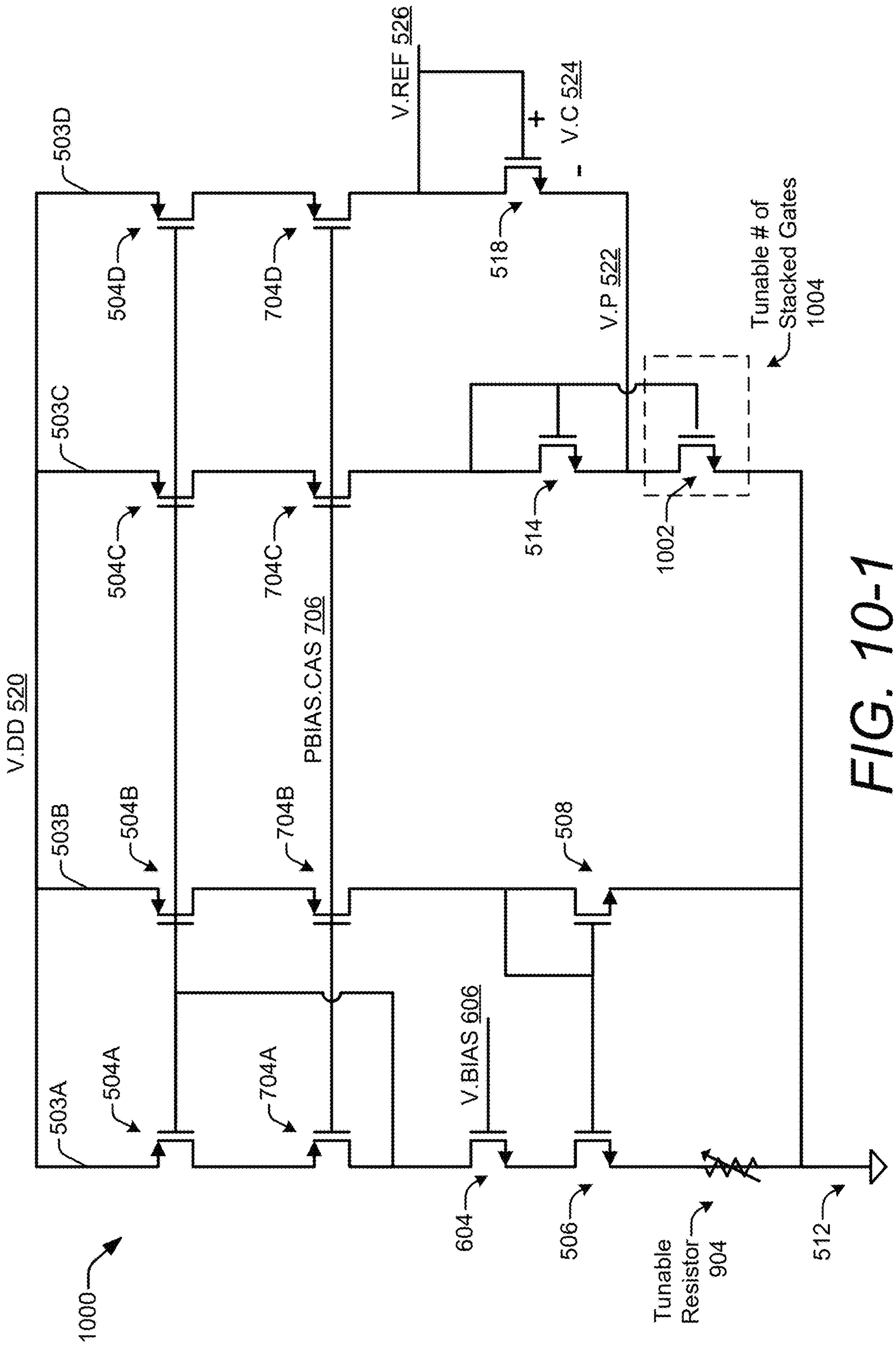
Figures 2, 10:
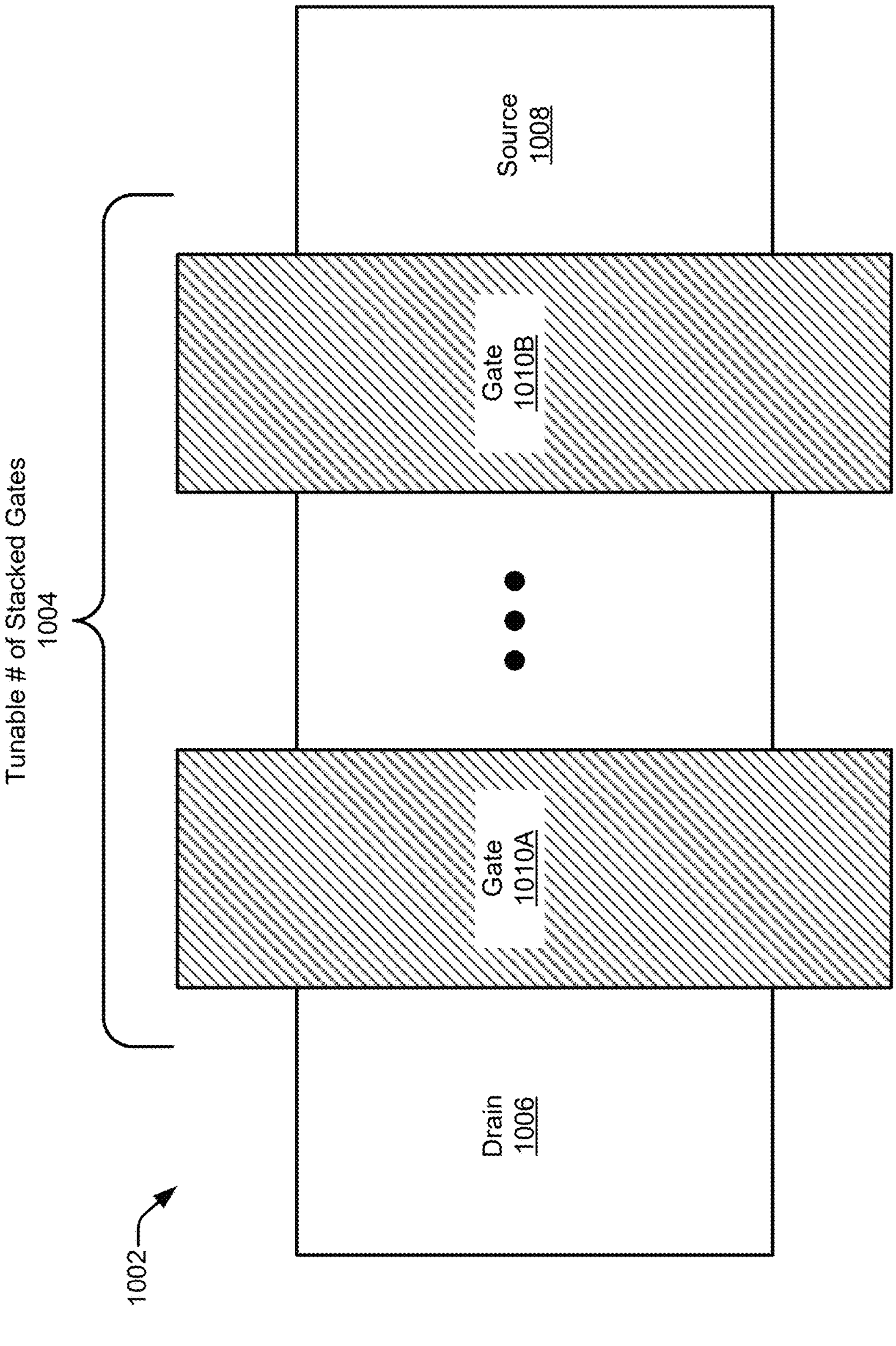

FIG. 10-1 is a circuit diagram illustrating another example reference voltage generator circuit 1000 including a transistor having a tunable number of stacked gates to improve the behavior of the reference voltage across a range of temperatures and process variations. The reference voltage generator circuit 1000 is similar to the reference voltage generator circuit 1000 of FIG. 9 except that the second NMOS transistor 516 is replaced by an NMOS transistor 1002 having a tunable number of stacked gates 1004. That is, the number of stacked gates 1004 forming the NMOS transistor 1002 is adjustable to adjust the length of the channel to modify the portion of the reference voltage (V.REF) 526 that is contributed by the PTAT voltage generator. The effective channel length of the transistor is based on a quantity of individual gates that are selected for use for the transistor 1002. The change in channel length of the transistor 1002 alters the temperature-dependent behavior of the PTAT portion by varying the gain of the PTAT voltage. In a particular implementation, the configurable number of gates are programmable to change the number of stacked gates that are coupled together to form a single gate for the device. The tunable number of stacked gates can be set to produce a relatively flat temperature curve, thereby facilitating tuning using a low-side switch to ground. In operation, small shifts in the reference voltage 526 can be compensated for using an LDO regulator with tunable gain once a flatter temperature curve has been established with the tunable number of stacked gates 1004.

FIG. 10-2 is a diagram illustrating a schematic view of an example of the NMOS transistor 1002 having tunable number of stacked gates 1004 of FIG. 10-1. The NMOS transistor 1002 includes a drain portion 1006, a source portion 1008 and multiple gate portions 1010. As shown, the multiple gate portions include a first gate portion 1010A and a second gate portion 1010B, but the multiple gate portions 1010 can include more gates. Although the example illustrated in FIG. 10-2 shows two gates, it should be understood that other implementations may have any desired number of gates (e.g., a few to several dozen gates) to improve the temperature variation characteristics of the reference voltage (V.REF) 526.

Although the implementation illustrated in FIG. 10-1 is shown as including the first cascode NMOS transistor 604, the first cascode PMOS transistor 704A, the second cascode PMOS transistor 704B, the third cascode PMOS transistor 704C, and the fourth cascode PMOS transistor 704D, in other implementations one or more of the first cascode NMOS transistor 604 and the first cascode PMOS transistor 704A, the second cascode PMOS transistor 704B, the third cascode PMOS transistor 704C, and the fourth cascode PMOS transistor 704D is omitted. Although the implementation illustrated in FIG. 10-1 is shown as omitting the multiplexer 804 shown in FIG. 8, other implementations may include a multiplexer to provide selectable bias. In addition, although the reference voltage generator circuit 1002 is shown as utilizing PMOS and NMOS transistor technologies, in other implementations other suitable transistor technologies may be used.

Having generally described schemes, techniques, and hardware for implementing configurable reference voltage generators, this discussion now turns to example methods.

Example Method

Figure 11:
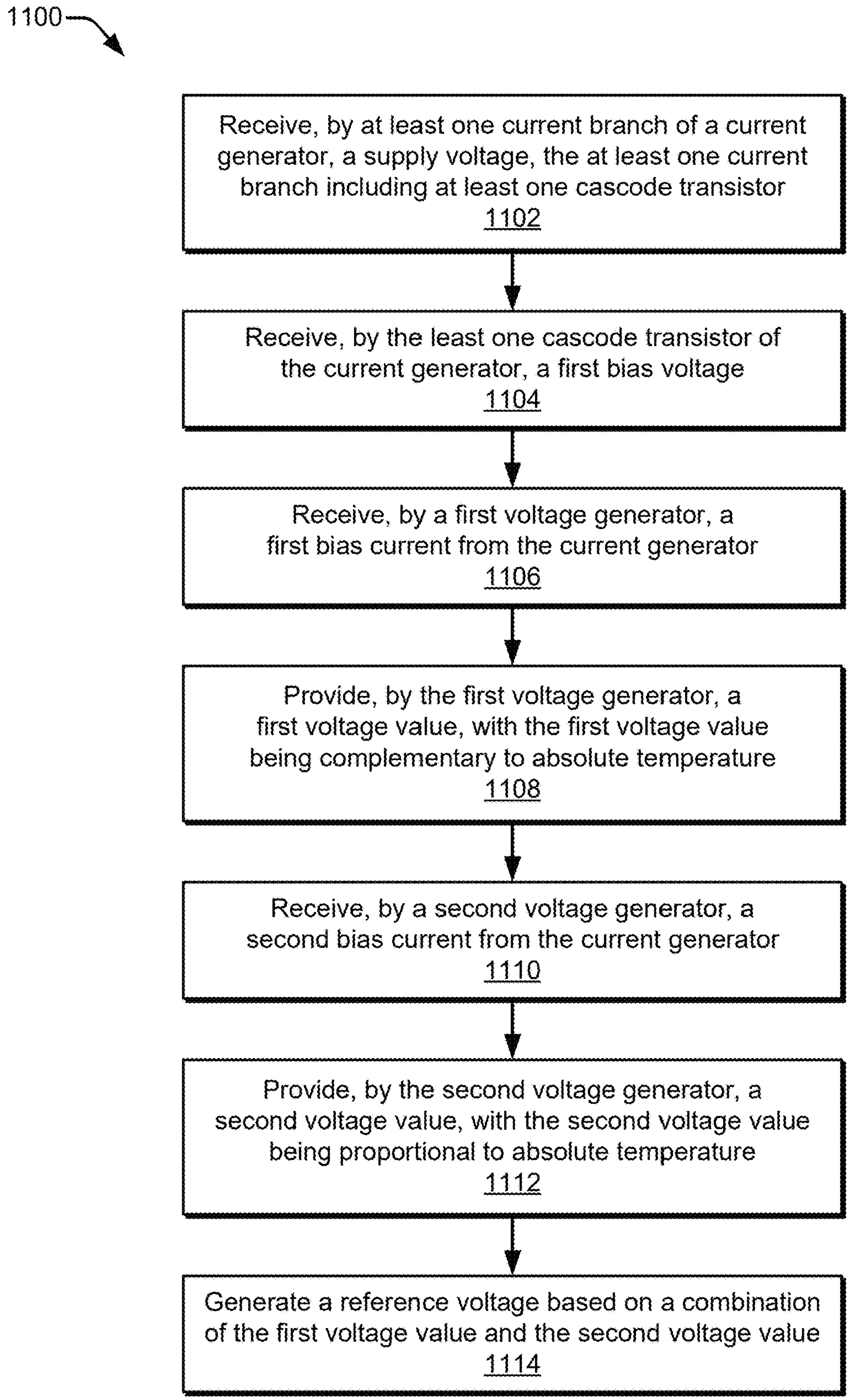
FIG. 11 is a flow diagram illustrating an example process for generating a reference voltage.

FIG. 11 is a flow diagram illustrating an example process 1100 for generating a reference voltage. The flow chart 1100 includes seven blocks 1102-1114. The operations of example processes can be performed by electronic circuit components as described herein. For example, the operations may be performed by at least one instance of the example reference voltage generators of FIGS. 6 to 10-2.

At block 1102, at least one current branch of a current generator receives a supply voltage. The at least one current branch includes at least one cascode transistor. For instance, the current generator 202 can receive the supply voltage (V.DD) 520. For example, at least one cascode transistor may include the first cascode NMOS transistor 604 of FIG. 6. In another example, the at least one cascode transistor may include the first cascode PMOS transistor 704A, the second cascode PMOS transistor 704B, the third cascode PMOS transistor 704C, or the fourth cascode PMOS transistor 704D of FIG. 7, or any combination of these cascode PMOS transistors including up to four transistors. In still another example, the at least one cascode transistor may include the first cascode NMOS transistor 604, the first cascode PMOS transistor 704A, the second cascode PMOS transistor 704B, the third cascode PMOS transistor 704C, or the fourth cascode PMOS transistor 704D of FIG. 8, or any combination of these cascode transistors including up to five transistors.

At block 1104, the least one cascode transistor of the current generator receives a first bias voltage. For example, in an implementation, the first cascode NMOS transistor 604 can receive the first bias voltage (V.BIAS) 606 at a gate terminal of the first cascode NMOS transistor 604. In another implementation, at least one of the first cascode PMOS transistor 704A, the second cascode PMOS transistor 704B, the third cascode PMOS transistor 704C, or the fourth cascode PMOS transistor 704D can receive the first bias voltage (PBIAS.CAS) 706 at respective gate terminals.

In an implementation, a multiplexer 804 may selectively provide a first voltage value or a second voltage value as the first bias voltage (PBIAS.CAS) 706 to the first cascode PMOS transistor 704A, the second cascode PMOS transistor 704B, the third cascode PMOS transistor 704C, or the fourth cascode PMOS transistor 704D (including two or more of such cascode PMOS transistors) based on a value of the supply voltage received by the current generator. For example, in an implementation, the first bias voltage value (e.g., PBIAS.CAS 706) can be provided based on the value of the supply voltage (V.DD) 520 being greater than a first threshold value, and the second bias voltage value (e.g. 0 Volts) can be provided based on the value of the supply voltage (V.DD) 520 being less than the first threshold value.

At block 1106, a first voltage generator receives a first bias current from the current generator. In an example implementation, the first voltage generator can be realized with a CTAT voltage generator 206 including the third NMOS transistor 518 that receives the first bias current via the fourth current branch 503D. At block 1108, the first voltage generator provides a first voltage value, with the first voltage value being complementary to absolute temperature. For example, in an implementation, the first voltage generator can provide the CTAT voltage (V.C) 524.

At block 1110, a second voltage generator receives a second bias current from the current generator. In an example implementation, the second voltage generator can be realized with a PTAT voltage generator 204 including the first NMOS transistor 514 and the second NMOS transistor 516 that receive the second bias current via the third current branch 503C. At block 1112, the second voltage generator provides a second voltage value, with the second voltage value being proportional to absolute temperature. For example, in an implementation, the second voltage generator can provide the PTAT voltage (V.P) 522.

Further, in an example implementation, a gain of the second voltage generator can be adjusted using a variable resistor 904 in the first current branch 503A. In another example implementation, the second voltage generator (e.g., the PTAT voltage generator 204) can include a first transistor 1002 having a configurable channel length coupled into a current branch (e.g., the third current branch 503C) of the current generator (e.g., the current generator 202) to adjust a gain of the second voltage generator. In at least some cases in accordance with this other example implementation, the configurable channel length can be set using a selected quantity of a tunable number of stacked gates 1004.

At block 1114, a reference voltage is generated based on a combination of the first voltage value and the second voltage value. For example, in an implementation, the first voltage value can be added to the second voltage value to produce the reference voltage. In an implementation, the reference voltage (V.REF) 526 can be provided to other circuitry, such as a voltage regulator circuit, a sensor circuit, or an ADC circuit. In other implementations, other mathematical or logical operations or processes may be used to combine the first voltage value and the second voltage value to produce the reference voltage value instead of, or in addition to, an addition operation.

Aspects of these methods may be implemented in, for example, hardware (e.g., fixed logic circuitry, a controller, a finite state machine, or a processor in conjunction with a memory), firmware, software, or some combination thereof. The methods may be realized using one or more of the apparatuses or components shown in FIGS. 1 to 4 and 6 to 10-2 (as illuminated by the description of FIGS. 5-1 and 5-2), which components may be further divided, combined, and so on. The devices and components of these figures generally represent hardware, such as electronic devices, PCBs, packaged modules, IC chips, components, or circuits; firmware; software; or a combination thereof. Thus, these figures illustrate some of the many possible systems or apparatuses capable of implementing the described methods.

For the methods described herein and the associated flow chart(s) and/or flow diagram(s), the orders in which operations are shown and/or described are not intended to be construed as a limitation. Instead, any number or combination of the described method operations can be combined in any order to implement a given method or an alternative method, including by combining operations from different ones of the flow chart(s) and flow diagram(s) and the earlier-described schemes and techniques into one or more methods. Operations may also be omitted from or added to the described methods. Further, described operations can be implemented in fully or partially overlapping manners.

Additional Example Apparatuses and Electronic Devices

Figure 12:
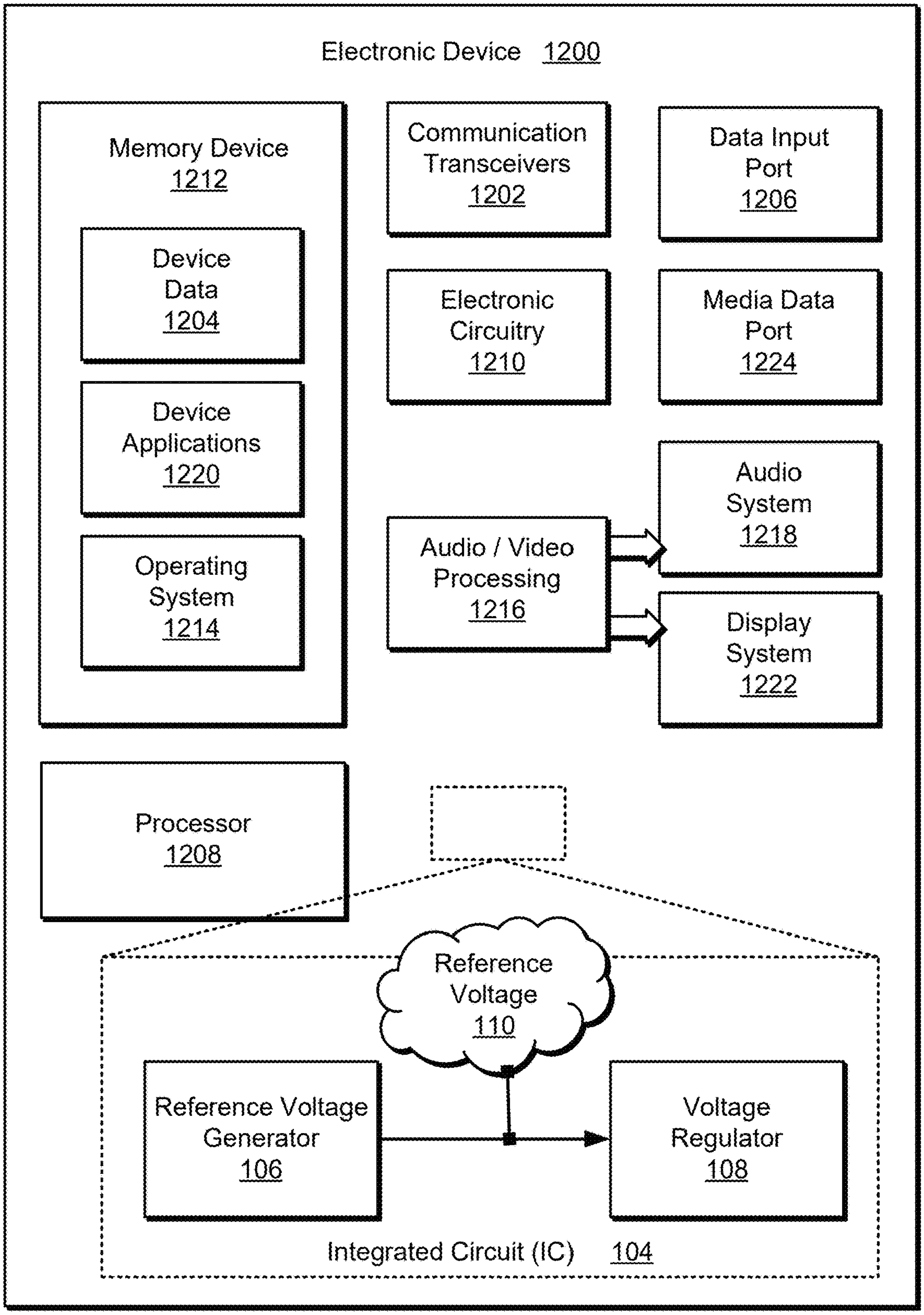
FIG. 12 illustrates various components of an example electronic device that can implement a reference voltage generator in accordance with one or more described aspects.

FIG. 12 illustrates various components of an example electronic device 1200 that can implement a configurable reference voltage generator in accordance with one or more described aspects. The electronic device 1200 may be implemented as any one or combination of a fixed, mobile, stand-alone, or embedded device or in any form of a consumer, computer, portable, user, server, communication, phone, navigation, gaming, audio, camera, messaging, media playback, and/or other type of electronic device 1200, such as the smartphone that is depicted in FIG. 1 as the apparatus 102. One or more of the illustrated components may be realized as discrete components or as integrated components on at least one integrated circuit of the electronic device 1200.

The electronic device 1200 can include one or more communication transceivers 1202 that enable wired and/or wireless communication of device data 1204, such as received data, transmitted data, or other information identified above. Example communication transceivers 1202 include near-field communication (NFC) transceivers, wireless personal area network (PAN) (WPAN) radios compliant with various IEEE 802.15 (Bluetooth®) standards, wireless local area network (LAN) (WLAN) radios compliant with any of the various IEEE 802.11 (Wi-Fi®) standards, wireless wide area network (WAN) (WWAN) radios (e.g., those that are 3GPP-compliant) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (WLAN) Ethernet transceivers.

The electronic device 1200 may also include one or more data input ports 1206 via which any type of data, media content, and/or other inputs can be received, such as user-selectable inputs, messages, applications, music, television content, recorded video content, and any other type of audio, video, and/or image data received from any content and/or data source, including a sensor like a microphone or a camera. The data input ports 1206 may include USB ports, coaxial cable ports, fiber optic ports for optical fiber interconnects or cabling, and other serial or parallel connectors (including internal connectors) for flash memory, DVDs, CDs, and the like. These data input ports 1206 may be used to couple the electronic device to components, peripherals, or accessories such as keyboards, microphones, cameras, or other sensors.

The electronic device 1200 of this example includes at least one processor 1208 (e.g., any one or more of application processors, microprocessors, digital-signal processors (DSPs), controllers, and the like), which can include a combined processor and memory system (e.g., implemented as part of an SoC), that processes (e.g., executes) computer-executable instructions to control operation of the device. The processor 1208 may be implemented as an application processor, embedded controller, microcontroller, security processor, artificial intelligence (AI) accelerator, graphics processor, and the like. Generally, a processor or processing system may be implemented at least partially in hardware, which can include components of an integrated circuit or on-chip system, a digital signal processor (DSP), an application-specific integrated circuit (ASIC), a field programmable gate array (FPGA), a complex programmable logic device (CPLD), and other implementations in silicon and/or other materials.

Alternatively or additionally, the electronic device 1200 can be implemented with any one or combination of electronic circuitry, which may include software, hardware, firmware, or fixed logic circuitry that is implemented in connection with processing and control circuits, which are generally indicated at 1210 (as electronic circuitry 1210). This electronic circuitry 1210 can implement executable or hardware-based modules (not shown in FIG. 12), such as through processing/computer-executable instructions stored on computer-readable media, through logic circuitry and/or hardware (e.g., such as an FPGA), and so forth.

The electronic device 1200 also includes one or more memory devices 1212 that enable data storage, examples of which include random-access memory (RAM), non-volatile memory (e.g., read-only memory (ROM), flash memory, EPROM, and EEPROM), and a disk storage device. Thus, the memory device(s) 1212 can be distributed across different logical storage levels of a system as well as at different physical components. The memory device(s) 1212 provide data storage mechanisms to store the device data 1204, other types of code and/or data, and various device applications 1220 (e.g., software applications or programs). For example, an operating system 1214 can be maintained as software instructions within the memory device 1212 and executed by the processor 1208.

In some implementations, the electronic device 1200 also includes an audio and/or video processing system 1216 that processes audio and/or video data and/or that passes through the audio and/or video data to an audio system 1218 and/or to a display system 1222 (e.g., a video buffer or a screen of a smartphone or camera). The audio system 1218 and/or the display system 1222 may include any devices that process, display, and/or otherwise render audio, video, display, and/or image data. Display data and audio signals can be communicated to an audio component and/or to a display component via an RF (radio-frequency) link, an S-video link, an HDMI (high-definition multimedia interface) link, a composite video link, a component video link, a DVI (digital video interface) link, an analog audio connection, a video bus, or another similar communication link, such as a media data port 1224. In some implementations, the audio system 1218 and/or the display system 1222 are external or separate components of the electronic device 1200. Alternatively, the display system 1222, for example, can be an integrated component of the example electronic device 1200, such as part of an integrated touch interface.

Any illustrated component can include, or be included as part of, the IC 104. Additionally or alternatively, a component that is not explicitly illustrated, such as a sensor (e.g., a temperature sensor) or a wireless modem, can include, or be included as part of, the IC 104. As described above with reference to FIG. 1, the IC 104 includes the reference voltage generator 106 that provides the reference voltage 110 to the voltage regulator 108. In various implementations, the reference voltage generator 106 may include one or more of the reference voltage circuits as described herein with respect to FIGS. 1 to 4 and 6 to 10-2 (as illuminated by the description of FIGS. 5-1 and 5-2).

The electronic device 1200 of FIG. 12 illustrates example implementations of the apparatus 102 of FIG. 1, of a device that can implement the example components of FIGS. 2 to 4, of a device that can implement the example circuitries of FIGS. 6 to 10-2, and of a device that can implement the example method of FIG. 11.

Example Aspects and Implementations for a Configurable Reference Voltage Generator In the following, some example aspects and implementations are described:

Example aspect 1: An apparatus for generating a reference voltage, the apparatus comprising: a current generator comprising at least one current branch configured to receive a supply voltage, the at least one current branch comprising at least one cascode transistor configured to receive a first bias voltage value; a first voltage generator configured to receive a first bias current from the current generator and provide a first voltage value, the first voltage value being complementary to absolute temperature; and a second voltage generator configured to receive a second bias current from the current generator and provide a second voltage value, the second voltage value being proportional to absolute temperature; the apparatus configured to provide a third voltage value based on a combination of the first voltage value and the second voltage value.

Example aspect 2: The apparatus of example aspect 1 or any other example aspect, wherein the at least one cascode transistor comprises a first cascode transistor and a second cascode transistor; and the at least one current branch comprises a first current branch comprising the first cascode transistor and a second current branch comprising the second cascode transistor.

Example aspect 3: The apparatus of example aspect 2 or any other example aspect, wherein the first cascode transistor and the second cascode transistor are each configured to receive the first bias voltage value.

Example aspect 4: The apparatus of example aspect 2 or any other example aspect, wherein the first current branch further comprises a variable resistor configured to adjust a gain of the second voltage generator. Additionally or alternatively, the first current branch further comprises a third cascode transistor configured to receive a third bias voltage value different from the first bias voltage value.

Example aspect 5: The apparatus of example aspect 1 or any other example aspect, further comprising a multiplexer comprising a first input configured to receive the first bias voltage value; a second input configured to receive a second bias voltage value; and an output configured to selectively provide the first bias voltage value or the second bias voltage value to the at least one cascode transistor based on a value of the supply voltage.

Example aspect 6: The apparatus of example aspect 5 or any other example aspect, wherein the output is configured to: provide the first bias voltage value based on the value of the supply voltage being greater than a first threshold value; and provide the second bias voltage value based on the value of the supply voltage being less than the first threshold value.

Example aspect 7: The apparatus of example aspect 1 or any other example aspect, wherein: the at least one current branch comprises a third current branch configured to provide the second bias current; and the second voltage generator comprises a first transistor having a configurable channel length coupled to the third current branch of the current generator, the first transistor configured to adjust a gain of the second voltage generator.

Example aspect 8: An apparatus for generating a reference voltage, the apparatus comprising: a current generator comprising: a first current branch configured to receive a supply voltage, the first current branch comprising a first cascode transistor configured to receive a first bias voltage; a second current branch configured to receive the supply voltage, the second current branch comprising a second cascode transistor configured to receive the first bias voltage; a third current branch configured to receive the supply voltage, the third current branch comprising a third cascode transistor configured to receive the first bias voltage; and a fourth current branch configured to receive the supply voltage, the fourth current branch comprising a fourth cascode transistor configured to receive the first bias voltage; a first voltage generator configured to receive a first bias current from the fourth cascode transistor and provide a first voltage value, the first voltage value being complementary to absolute temperature; and a second voltage generator configured to receive a second bias current from the third cascode transistor and provide a second voltage value, the second voltage value being proportional to absolute temperature; the apparatus configured to generate the reference voltage based on the first voltage value and the second voltage value.

Example aspect 9: The apparatus of example aspect 8 or any other example aspect, further comprising: a multiplexer including: a first input configured to receive the first bias voltage value; a second input configured to receive a second bias voltage value; and an output configured to selectively provide the first bias voltage value or the second bias voltage value to the first cascode transistor, the second cascode transistor, the third cascode transistor, and the fourth cascode transistor based on a value of the supply voltage.

Example aspect 10: The apparatus of example aspect 8 or any other example aspect, wherein the first current branch further comprises a fifth cascode transistor coupled in series with the first cascode transistor, the fifth cascode transistor configured to receive a third bias voltage.

Example aspect 11: The apparatus of example aspect 8 or any other example aspect, wherein the first current branch further comprises a variable resistor configured to adjust a gain of the second voltage generator.

Example aspect 12: The apparatus of example aspect 8 or any other example aspect, wherein the second voltage generator comprises a first transistor coupled to the third current branch of the current generator and having a configurable channel length, the configurable channel length corresponding to a tunable quantity of stacked gates to adjust a gain of the second voltage generator.

Example aspect 13: The apparatus of example aspect 12 or any other example aspect, wherein the second voltage generator further comprises a second transistor coupled to the first transistor.

Example aspect 14: The apparatus of example aspect 8 or any other example aspect, wherein the current generator comprises a current mirror configured to mirror at least one current in the first current branch to produce the first bias current in the fourth current branch and the second bias current in the third current branch.

Example aspect 15: The apparatus of example aspect 8 or any other example aspect, wherein: the second voltage generator is configured to provide the second voltage value to the first voltage generator; and the first voltage generator is configured to add the first voltage value to the second voltage value to generate the reference voltage.

Example aspect 16: A method for generating a reference voltage, the method comprising: receiving, by at least one current branch of a current generator, a supply voltage, the at least one current branch comprising at least one cascode transistor; receiving, by the least one cascode transistor, a first bias voltage value; receiving, by a first voltage generator, a first bias current from the current generator; providing, by the first voltage generator, a first voltage value, the first voltage value being complementary to absolute temperature; receiving, by a second voltage generator, a second bias current from the current generator; providing, by the second voltage generator, a second voltage value, the second voltage value being proportional to absolute temperature; and generating the reference voltage based on a combination of the first voltage value and the second voltage value.

Example aspect 17: The method of example aspect 16 or any other example aspect, further comprising: receiving, at a first input of a multiplexer, the first bias voltage value; receiving, at a second input of the multiplexer, a second bias voltage value; and selectively providing, at an output of the multiplexer, the first bias voltage value or the second bias voltage value to the at least one cascode transistor based on a value of the supply voltage.

Example aspect 18: The method of example aspect 17 or any other example aspect, wherein selectively providing the first bias voltage value or the second basis voltage value comprises: providing the first bias voltage value based on the value of the supply voltage being greater than a first threshold value; and providing the second bias voltage value based on the value of the supply voltage being less than the first threshold value.

Example aspect 19: The method of example aspect 16 or any other example aspect, further comprising: propagating a current through a variable resistor of the at least one current branch.

Example aspect 20: The method of example aspect 16 or any other example aspect, wherein generating the reference voltage based on a combination of the first voltage value and the second voltage value comprises: adding the first voltage value to the second voltage value to generate the reference voltage.

Features described in the context of one aspect (e.g., a method or an apparatus) may be used in combination with other aspects (e.g., an apparatus or a method, respectively, or a different method or a different apparatus).

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Although implementations for realizing reference voltage generation have been described in language specific to certain features and/or methods, the subject of the appended claims is not necessarily limited to the specific features or methods described. Rather, the specific features and methods are disclosed as example implementations for realizing reference voltage generation.

What is claimed is:

1. An apparatus for generating a reference voltage, the apparatus comprising:

a current generator comprising at least one current branch configured to receive a supply voltage, the at least one current branch comprising at least one cascode transistor configured to receive a first bias voltage value;

a first voltage generator configured to receive a first bias current from the current generator and provide a first voltage value, the first voltage value being complementary to absolute temperature; and a second voltage generator configured to receive a second bias current from the current generator and provide a second voltage value, the second voltage value being proportional to absolute temperature, the apparatus configured to provide a third voltage value based on a combination of the first voltage value and the second voltage value.

2. The apparatus of claim 1, wherein:

the at least one cascode transistor comprises a first cascode transistor and a second cascode transistor; and the at least one current branch comprises a first current branch comprising the first cascode transistor and a second current branch comprising the second cascode transistor.

3. The apparatus of claim 2, wherein the first cascode transistor and the second cascode transistor are each configured to receive the first bias voltage value.

4. The apparatus of claim 2, wherein the first current branch further comprises a variable resistor configured to adjust a gain of the second voltage generator.

5. The apparatus of claim 1, further comprising:

a multiplexer comprising:

a first input configured to receive the first bias voltage value;

a second input configured to receive a second bias voltage value; and an output configured to selectively provide the first bias voltage value or the second bias voltage value to the at least one cascode transistor based on a value of the supply voltage.

6. The apparatus of claim 5, wherein the output is configured to:

provide the first bias voltage value based on the value of the supply voltage being greater than a first threshold value; and provide the second bias voltage value based on the value of the supply voltage being less than the first threshold value.

7. The apparatus of claim 1, wherein:

the at least one current branch comprises a third current branch configured to provide the second bias current; and the second voltage generator comprises a first transistor having a configurable channel length coupled to the third current branch of the current generator, the first transistor configured to adjust a gain of the second voltage generator.

8. An apparatus for generating a reference voltage, the apparatus comprising:

a current generator comprising:

a first current branch configured to receive a supply voltage, the first current branch comprising a first cascode transistor configured to receive a first bias voltage;

a second current branch configured to receive the supply voltage, the second current branch comprising a second cascode transistor configured to receive the first bias voltage;

a third current branch configured to receive the supply voltage, the third current branch comprising a third cascode transistor configured to receive the first bias voltage; and a fourth current branch configured to receive the supply voltage, the fourth current branch comprising a fourth cascode transistor configured to receive the first bias voltage;

a first voltage generator configured to receive a first bias current from the fourth cascode transistor and provide a first voltage value, the first voltage value being complementary to absolute temperature; and a second voltage generator configured to receive a second bias current from the third cascode transistor and provide a second voltage value, the second voltage value being proportional to absolute temperature, the apparatus configured to generate the reference voltage based on the first voltage value and the second voltage value.

9. The apparatus of claim 8, further comprising:

a multiplexer including:

a first input configured to receive a first bias voltage value;

a second input configured to receive a second bias voltage value; and an output configured to selectively provide, based on a value of the supply voltage, the first bias voltage value or the second bias voltage value to the first cascode transistor, the second cascode transistor, the third cascode transistor, and the fourth cascode transistor as the first bias voltage.

10. The apparatus of claim 8, wherein the first current branch further comprises a fifth cascode transistor coupled in series with the first cascode transistor, the fifth cascode transistor configured to receive a third bias voltage.

11. The apparatus of claim 8, wherein the first current branch further comprises a variable resistor configured to adjust a gain of the second voltage generator.

12. The apparatus of claim 8, wherein the second voltage generator comprises a first transistor coupled to the third current branch of the current generator and having a configurable channel length, the configurable channel length corresponding to a tunable quantity of stacked gates to adjust a gain of the second voltage generator.

13. The apparatus of claim 12, wherein the second voltage generator further comprises a second transistor coupled to the first transistor.

14. The apparatus of claim 8, wherein the current generator comprises a current mirror configured to mirror at least one current in the first current branch to produce the first bias current in the fourth current branch and the second bias current in the third current branch.

15. The apparatus of claim 8, wherein:

the second voltage generator is configured to provide the second voltage value to the first voltage generator; and the first voltage generator is configured to add the first voltage value to the second voltage value to generate the reference voltage.

16. A method for generating a reference voltage, the method comprising:

receiving, by at least one current branch of a current generator, a supply voltage, the at least one current branch comprising at least one cascode transistor;

receiving, by the at least one cascode transistor of the current generator, a first bias voltage;

receiving, by a first voltage generator, a first bias current from the current generator;

providing, by the first voltage generator, a first voltage value, the first voltage value being complementary to absolute temperature;

receiving, by a second voltage generator, a second bias current from the current generator;

providing, by the second voltage generator, a second voltage value, the second voltage value being proportional to absolute temperature; and generating the reference voltage based on a combination of the first voltage value and the second voltage value.

17. The method of claim 16, further comprising:

selectively providing, based on a value of the supply voltage, a first bias voltage value or a second bias voltage value to the at least one cascode transistor as the first bias voltage.

18. The method of claim 17, wherein selectively providing the first bias voltage value or the second basis voltage value to the at least one cascode transistor as the first bias voltage comprises:

providing the first bias voltage value based on the value of the supply voltage being greater than a first threshold value; and providing the second bias voltage value based on the value of the supply voltage being less than the first threshold value.

19. The method of claim 16, further comprising:

propagating a current through a variable resistor of the at least one current branch.

20. The method of claim 16, wherein generating the reference voltage based on a combination of the first voltage value and the second voltage value comprises:

adding the first voltage value to the second voltage value to generate the reference voltage.

* * * * *